United States Patent [19]

Klaiber et al.

[11] 3,860,762

[45] Jan. 14, 1975

[54] TOLL RESTRICTION CIRCUIT

[75] Inventors: Gerhart F. Klaiber, Deal; Ove Villadsen, Spring Lake Heights, both of N.J.; Charles Schwartz, Philadelphia, Pa.

[73] Assignee: TIE/Communications, Inc., Stamford, Conn.

[22] Filed: Dec. 6, 1972

[21] Appl. No.: 312,768

[52] U.S. Cl. .......... 179/18 DA

[51] Int. Cl. .......... H04m 1/66

[58] Field of Search .......... 179/18 DA, 27 CB, 84 R, 179/84 L

[56] References Cited

UNITED STATES PATENTS

| | | | |
|---|---|---|---|
| 2,921,987 | 1/1960 | Pedrick | 179/27 CB |
| 3,448,221 | 6/1969 | Svala | 179/18 DA |
| 3,469,036 | 9/1969 | Meri | 179/84 R |
| 3,566,042 | 2/1971 | Pugliese | 179/27 CB |
| 3,692,951 | 9/1972 | Hestad | 179/18 DA |

*Primary Examiner*—William C. Cooper

*Attorney, Agent, or Firm*—Kenyon & Kenyon Reilly Carr & Chapin

[57] ABSTRACT

The invention is an electronic circuit, electrically inserted into the pair of wires connecting a telephone central office with a preselected subscriber's subset, for preventing use of that subset to make long distance telephone calls, either by direct dialing, or with operator assistance, being so constructed and arranged, that in response to the electrical pulses generated by dialing, it interrupts the electrical connection between the central office and that subset, whenever the first digit dialed is "0" or "1," or whenever the second digit dialed is "0" or "1," except when the first digit dialed is "4" or "9," and the next two digits dialed are "1's."

27 Claims, 13 Drawing Figures

PATENTED JAN 14 1975

3,860,762

TOLL RESTRICTION CIRCUIT

BACKGROUND OF THE INVENTION

1. FIELD OF THE INVENTION

The invention relates to telephone communication systems, and particularly to electronic circuits for restricting the operation of one or more preselected subsets connected to the system.

2. DESCRIPTION OF THE PRIOR ART

By dialing 10 digits, the area code and a telephone number, a subscriber can be connected to almost any other telephone in the United States and Canada without obtaining operator assistance. It is at times desirable, particularly in a business office, to assure that one or more of the subscriber's subsets, there in operation, cannot be used to make unauthorized long distance, or toll, telephone calls.

Generally, conventional subsets incorporate one of two different kinds of dialing apparatus, i.e., rotary dialing apparatus and pushbutton dialing apparatus. In the former, rotary dials generate dial pulses, at the nominal rate of 10 per second, regardless of the digit dialed; the number of dial pulses generated corresponds to the digit number, e.g., one pulse is generated for the digit 1, two for 2, etc., with 10 pulses being generated for the digit 0. In the latter, pushbutton-activated tuned circuits (sometimes called "keypulsing apparatus") develop a-c multi-frequency pulses, whose frequencies are representative of the digit dialed. As used in the following specifications, the terms "dialing" and "dialed" refer to operation of either rotary dialing apparatus or pushbutton dialing apparatus, unless the context in which it is used specifically limits its meaning to one or the other apparatus.

Known toll restriction circuits used to prevent unauthorized toll calls do not interrupt the connection established between a subset to be restricted and a central office, until all ten digits are dialed. This is an uneconomical use of the telephone system switching circuits, because the dialing of ten digits activates switching circuits in the telephone system to establish a talking path to the called number. No other subscriber can utilize those activated switching circuits until the restricted subset is disconnected from the central office.

Moreover, known circuits used to restrict subsets can undesirably electrically interfere with the operation of the central office equipment and apparatus. The telephone company requires that such restriction circuits be used only with "interface" equipment, which is provided by the telephone company, at the subscriber's expense, and electrically connected between the central office and the restriction circuit.

SUMMARY OF THE INVENTION

It is, therefore, an object of the present invention to provide a new and useful toll restriction circuit, which does not possess the deficiencies of known toll restriction circuits.

More particularly, it is an object of the present invention to provide a new and useful toll restriction circuit which restricts toll usage of a subset after no more than three digits are dialed.

It is a further object of the invention to provide a new uni-directional electrical signal coupling circuit, which incorporates an optoelectronic device, having particular applicability in a toll restriction circuit constructed in accordance with the present invention, to make use of interface equipment unnecessary.

Still another object of the present invention is to provide a novel electrical pulse detector or "filter" designed to discriminate among input pulses of various widths, generating an output only when the width of an input pulse lies within a preselected range.

Other and further objects and advantages of the present invention are apparent to those skilled in the art from the detailed specifications of the invention set forth herein.

In accordance with one aspect of the invention, a toll restriction circuit for preventing the placement of unauthorized toll calls from a preselected subset electrically coupled to a telephone central office by a pair of wires, includes means, electrically connected to at least one of the wires, for supplying a portion of the signals transmitted on the pair of wires, including at least the electrical pulse train representative of the digits dialed at the subset, and optoelectronic device means, responsive to the supplied signals for deriving a light output signal representative of the supplied signals. The toll restriction circuit further includes means responsive to the light output signal for generating an electrical pulse for each light pulse, which occurs in the light output signal and has a width in a preselected range of widths, which corresponds to the range of widths of dial pulses in the electrical pulse train. In addition, the toll restriction circuit includes first means and second means responsive to the output of the pulse generating means. The first means is for supplying a signal, representative of the ordinal position of each digit dialed, to the second means. The second means is constructed and arranged to combine the inputs thereto, for determining whether the digits dialed at the subset constitute a dialing code to be restricted, and for generating an output signal representative of that determination.

In accordance with another aspect of the invention, a method for restricting the placement of toll calls from a preselected subset comprises the step of supplying a portion of the electrical signal transmitted on a pair of wires between the preselected subset and a telephone central office, including at least the electrical signals representative of digits dialed at the subset. The method further includes the steps of deriving from the last-mentioned signals, a first set of electrical signals representative of the digit number of at least the first two digits dialed, and deriving a second set of electrical signals representative of the ordinal positions of at least the first two digits dialed. The method additionally includes the steps of combining the first and second sets of electrical signals to determine whether (i) the first digit dialed at the subset is 0, and if not, (ii) whether the second digit dialed is 0 or 1, and automatically interrupting the electrical connection between the subset and the central office, upon determining that the first digit dialed is 0, or that the second digit dialed is 0 or 1.

BRIEF DESCRIPTION OF THE DRAWINGS

FIG. 3 is a schematic of one embodiment of the sensing circuit 200, incorporated in the toll restriction circuit of FIG. 1;

DESCRIPTION OF PREFERRED EMBODIMENTS

I. INTRODUCTION

Figure 1:
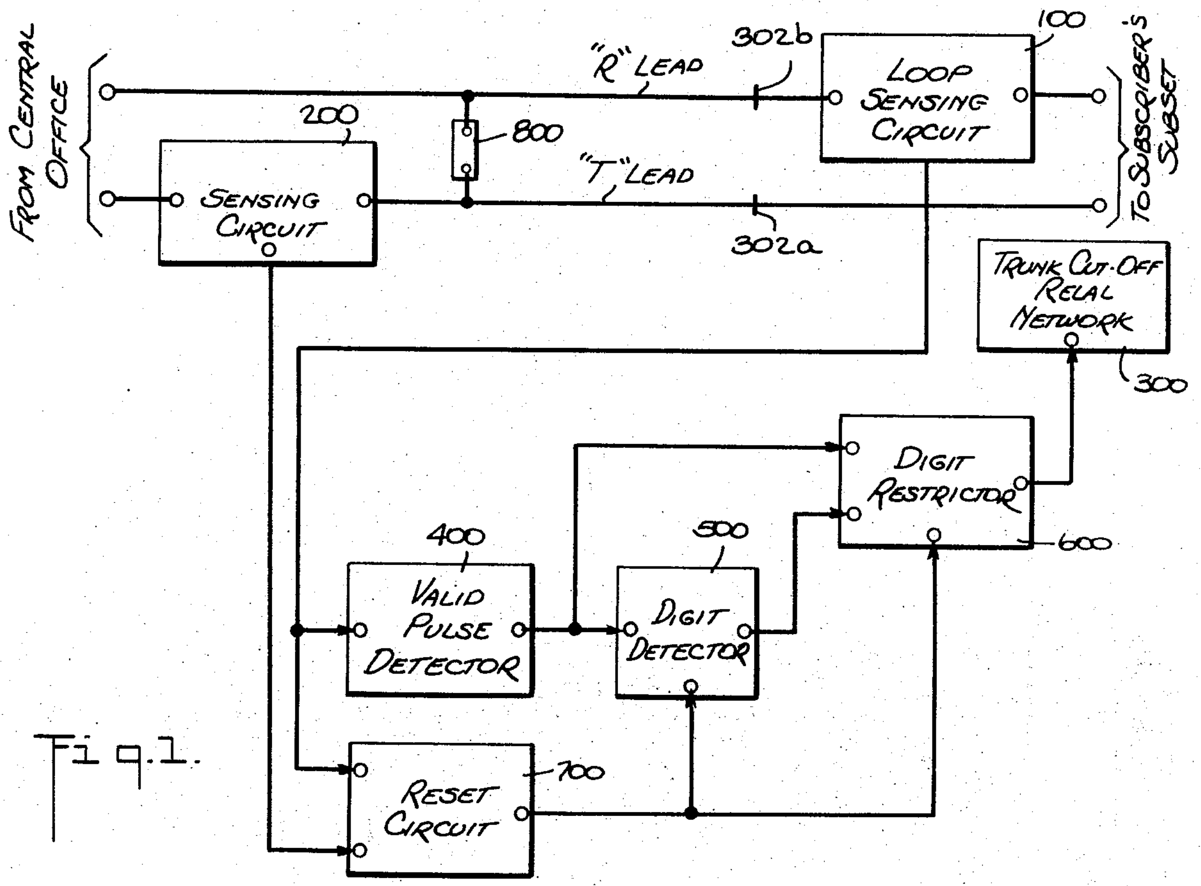
FIG. 1 is a block diagram of one embodiment of a toll restriction circuit, constructed in accordance with the invention.

Toll restriction circuits constructed in accordance with the invention are designed to be electrically inserted, at any convenient location, into the pair of wires which connects a subscriber's subset and a telephone central office (hereinafter "central office"). One embodiment of the restriction circuit of the invention is shown in FIG. 1. It performs its subscriber restriction functions after no more than three digits are dialed at a preselected subset to be restricted.

A pair of wires, commonly called "tip" and "ring" conductors and designated "T" and "R" in the drawings, connects a subscriber's subset to a central office. In accordance with one aspect of the invention, as embodies in the network shown in FIG. 1, the toll restriction circuit disconnects a subset associated therewith from the central office when (1) the first digit dialed is 0 or 1 or (2) the second digit dialed is 0 or 1, except when the first digit dialed is 4 or 9 and the second digit and third digits dialed are 1's. The choice of restrictions, and their exceptions, are based on the facts that area code numbers, assigned to most parts of North America by the Bell System, consist of three numerals. In each Bell System area code, the first digit does not contain 0 or 1, the second digit is either 0 or 1, and the third digit utilizes the numbers 1 to 9 and 0. Moreover, in certain areas, direct dialing of long distance telephone calls can only be effected by preceding the dialed area code with the dialed digit 1.

However, certain Bell System number combinations are reserved, e.g., 411 for information, and 911, the national emergency code for summoning police. In accordance with one aspect of the invention, the subset to be restricted is allowed to reach the 411 and 911 stations, but is denied access to the "operator," i.e., code 0, and to the direct distance dialing intertoll network by use of an area code, or the use of code 1 followed by an area code.

Accordingly, a preferred method of restricting placement of toll calls from a preselected subset includes the step of electrically determining (i) whether the first digit dialed at the subset is 0 or 1, and if not, (ii) whether the second digit dialed is 0 or 1, and automatically interrupting the electrical connection between the subset and the central office, upon determining that the first digit dialed is 0 or 1, or that the second digit dialed is 0 or 1. In further accordance with the invention, the method additionally includes the step of galvanically isolating the central office from the electrical effects of the foregoing steps.

Referring to FIG. 1, this embodiment of the apparatus of the toll restriction circuit includes a first group of circuits 100, 200, 300 electrically inserted into the T and R leads between the central office and a subset to be restricted, and a second group of circuits 400, 500, 600, 700, coupled to the first group, but galvanically isolated from the central office, for controlling the subset's access to the central office. The first group of circuits includes a loop sensing circuit 100, a sensing circuit 200 and a trunk cut-off relay network 300. The network 300 includes a relay 301 (FIG. 9), whose normally closed contacts 302*a*, 302*b* (FIG. 1) are electrically inserted into the T and R leads respectively. A suitable resistance 800 shunts the T and R leads, to provide a closed loop current path between the central office and the parallel sensing circuit 200, and to provide a conductance of high enough impedance level to be recognized as a subset "on-hook" condition by the central office, when the subset is "on-hook."

When the subset goes "off-hook," the central office applies dial tone to the T and R leads, and direct current is drawn from the central office battery. When a call is then initiated by dialing, the loop sensing circuit 100 couples the signals transmitted on the T and R leads, including at least the dial pulses generated by the subset to a pulse generating means, for example, valid pulse detector 400, which generates an output only in response to a true dial pulse. The output of pulse detector 400 is coupled to a first means responsive to the output of that pulse generating means, for example, digit detector 500, which generates an output at the end of each pulse train that corresponds to a dialed digit. The output of pulse detector 400 is also coupled to a second means responsive thereto, for example, digit restrictor 600. The output of digit detector 500 is also coupled to the digit restrictor 600.

In accordance with one aspect of the invention, the digit restrictor 600 is in essence a combinational logic circuit, which identifies the digits being dialed, and determines whether the trunk cut-off relay network 300 is to be activated to open the T lead; network 300 is preferably so activated when (a) the first digit dialed is 0 or 1, (b) the second digit dialed is 0 or 1. When a restricted combination of digits is dialed, the T lead is opened by energizing the relay 301 (FIG. 9) to break the normally closed contacts 302*a*, 302*b*. The central office recognizes this opening of the T and R leads as an on-hook signal, and disconnects from the subset. In accordance with another aspect of the invention, the digit restrictor 600 is constructed and arranged (FIGS. 7, 8) to allow completion of calls dialed to the information (411) and emergency exchanges (911).

After operation of the digit restrictor 600, a reset circuit 700 (FIG. 1) is activated to restore a first logic network means 504 in the digit detector 500 (FIG. 5A) and a second logic network 607 in the digit restrictor 600 (FIG. 6) to their quiescent states, in which they remain until another call is initiated by the subset. At the same time, relay 301 is deenergized, closing contacts 302; the central office recognizes closing of the T and R leads as an off-hook signal, and restores d-c battery and dial tone to the T and R leads.

Figure 11:
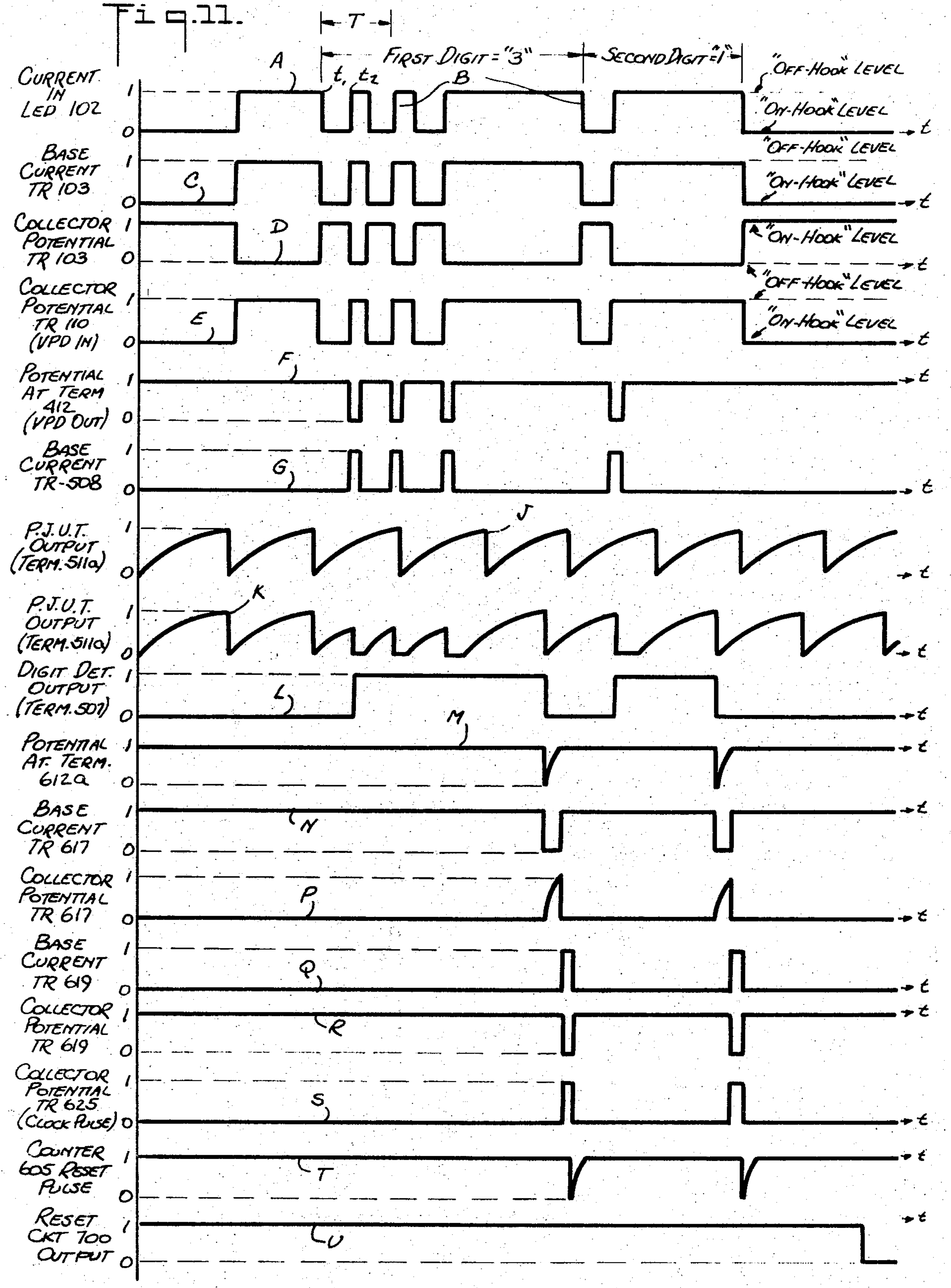
FIG. 11 illustrates electrical waveforms pertinent to the description of the circuits shown in FIGS. 1, 2 and 4–10.

Referring to the waveforms illustrated in FIG. 11, it is noted that all are drawn to the same time scale, although their respective ordinate values are arbitrarly selected. For purposes of explanation, these waveforms are drawn to represent a condition in which the first digit dialed is 3, and the second digit dialed is 1; this combination is a restricted code, and in response, the toll restricted circuit disconnects the subset from the central office. Furthermore, in the ensuing detailed circuit description, voltages obtained at pertinent points are termed "low" or 0 level states and "high" or 1 level states when appropriate. These terms have conventional meaning and usage in the art, and as used herein, have that meaning.

II. SENSING CIRCUITS 100, 200

Figure 2:
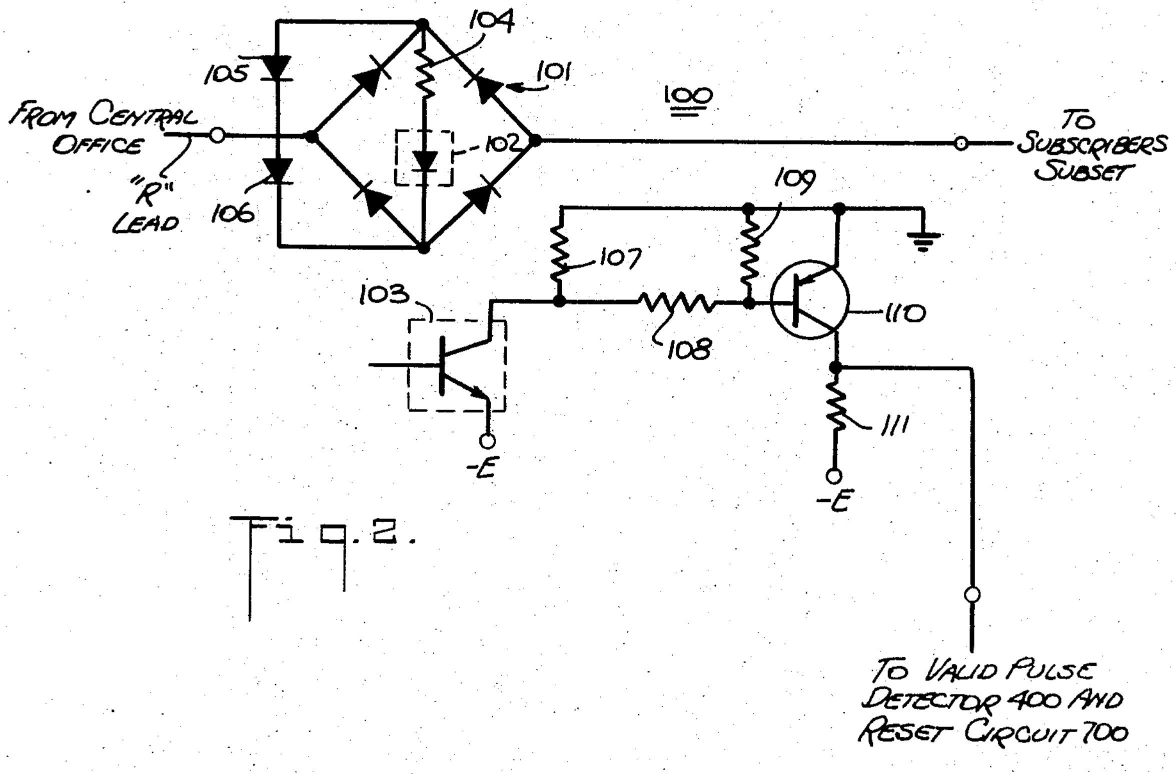
FIG. 2 is a schematic of one embodiment of the loop sensing circuit 100, incorporated in the toll restriction circuit of FIG. 1.

The toll restriction circuit embodiment shown in FIG. 1 includes a loop sensing circuit 100 (FIG. 2) and a sensing circuit 200 (FIG. 3). Each sensing circuit includes a novel uni-directional coupling network, which incorporates an optoelectronic device means, for galvanically isolating the central office from the balance of the toll restriction circuit.

In accordance with this aspect of the invention, identical four-diode bridges 101 (FIG. 2) and 201 (FIG. 3) are incorporated in the R and T leads respectively, although both bridges can be incorporated in the same lead, on either side of resistance 800; these diode bridges make the operation of the optoelectronic device means, associated therewith, independent of the polarity of the battery connected to the line by the central office. Each bridge incorporates an optoelectronic device means, each having an electrical port and an output optic port, for example, a light emitting diode (hereinafter called an "LED") 102 (FIG. 2) and 202 (FIG. 3), whose respective output optic ports are optically coupled to the input optic ports of two additional optoelectronic device means, for example, photosensitive transistors 103 (FIG. 2) and 203 (FIG. 3), respectively. These combinations of optoelectronic device means provide uni-directional coupling from the T and R leads to the balance of the toll restriction circuit, galvanically isolating it from the central office. Hence, provision of conventional interface equipment between the central office and toll restriction circuit is unnecessary. Moreover, in the quiescent state of the toll restriction circuit, i.e., when the subset is on-hook, the diode bridges 101, 201 allow coupling of supervisory and ringing signals from the central office to the subset, without affecting the toll restriction circuit.

Preferably, each LED 102, 202 is serially connected to a resistance 104, 204, respectively; these series branches are shunted by serially connected diodes 105, 106 (FIG. 2) and 205, 206 (FIG. 3) respectively. These diodes protect their associated LED's from high voltage surges that may occur on the line. The resistances 104, 204 enhance the protection thereby afforded, by flattening the effective voltage-current characteristics of the LED's 102, 202.

When the subset goes off-hook current from the central office is coupled through the LED's 102, 202 to the subset (FIG. 11, waveform A). The substantially constant light output of LED 102 switches photosensitive transistor 103 "on." Subscriber dialing interrupts the current in LED 102 (FIG. 11, waveform A, dial pulses B). The light output of the loop sensing circuit LED 102 in response thereto is a train of light "pulses," which is optically coupled to the photosensitive transistor 103, and switches it off and on (FIG. 11, waveform C), thereby converting the light pulses to electrical pulses. The collector electrode potential (FIG. 11, waveform D) of transistor 103 is coupled through resistance network 107, 108, 109 to the base electrode of transistor 110, which is biased by resistance 111. The output of loop sensing circuit 100 is taken at the collector electrode of transistor 110; it comprises a train of negative-going voltage pulses (FIG. 11, waveform E), which correspond on a one-to-one basis to the dial pulses generated by the subset. This train of converted electrical pulses is coupled to the valid pulse detector 400 and to the reset circuit 700.

Referring to FIG. 3, the sensing circuit 200 is operative to initiate operation of the reset circuit 700 (FIG. 1), whenever the central office disconnects from the subset.

In the quiescent state of the sensing circuit 200, current flows in the LED 202; its substantially constant light output switches the photosensitive transistor 203 on, thereby converting the light signal to an electrical signal. In this condition, with current flowing in load resistance 214, the collector electrode potential of photosensitive transistor 203 is at 0 level. That collector electrode is coupled to the base electrode of transistor 207. In the quiescent state, this transistor is off; its emitter electrode potential is at 0 level. The emitter electrode of transistor 207 is coupled to a time delay network which includes resistances 208, 209, 211 and capacitance 210. The values of resistances 208, 209, 211 and of capacitance 210 are selected to provide a time delay large enough to assure that the reset circuit 700 does not respond to the output of the sensing circuit 200 during dialing.

Figure 10:
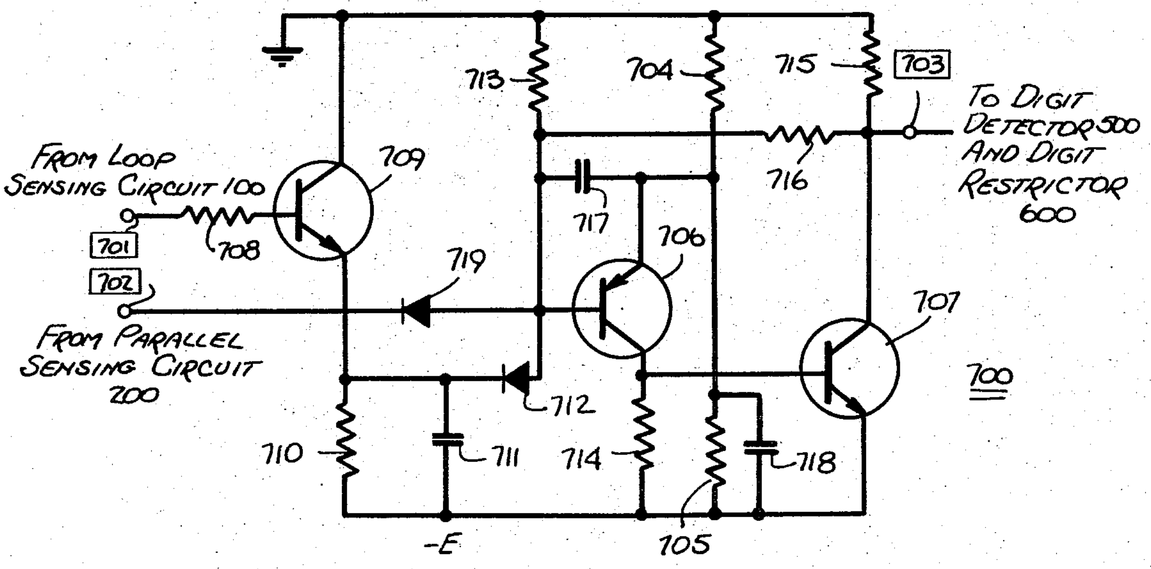
FIG. 10 is a schematic of one embodiment of the reset circuit 700, incorporated in the toll restriction circuit of FIG. 1.

The output of the time delay network is coupled to the base electrode of transistor 212, which is biased by resistance 213. In the quiescent state, this transistor is also off; its collector electrode potential is at 1 level. The collector electrode potential of transistor 212 is taken as the output of the sensing circuit 200; this signal is coupled to the reset circuit 700 (FIG. 10).

Figure 12:
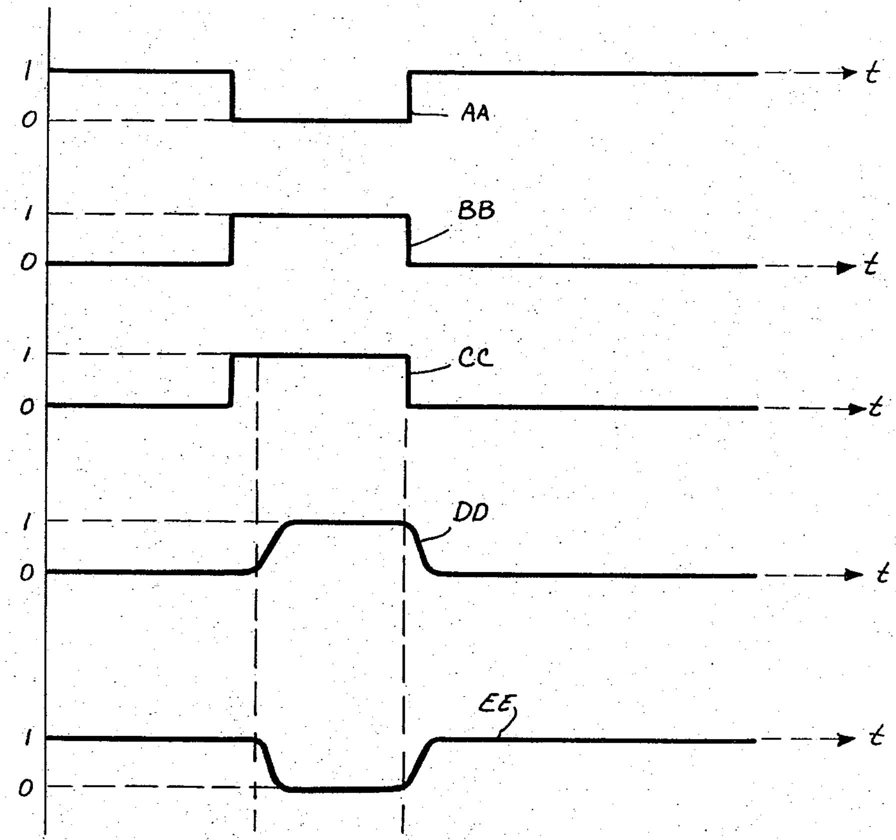
FIG. 12 illustrates electrical waveforms pertinent to the description of the circuit shown in FIG. 3.

Current in LED 202 is interrupted by conditions at the central office, for example disconnection from the T and R leads. When the current in LED 202 is interrupted, (FIG. 12, waveform AA), the photosensitive transistor 203 is switched off; the collector electrode potential of transistor 203 rises to the 1 level (FIG. 12, waveform BB). The emitter electrode potential of transistor 207 is thereby switched from low to high level (FIG. 12, waveform CC). This positive-going voltage pulse is delayed by network 208, 209, 210, 211 (FIG. 12, waveform DD), and then switches transistor 212 on, developing a negative-going pulse (FIG. 12, waveform EE), at the collector electrode of transistor 212. Preferably, resistance 208, which determines the time delay imparted to the leading edge of the electrical pulse developed at the emitter electrode of transistor 207 (FIG. 12, waveform CC), is a variable resistance whose range of values is selected to match the wide range of impedance characteristics encountered from one central office to another.

This change in collector electrode potential, from 1 to the 0 level, is coupled to the reset circuit 700 (FIG. 10) with the result described below.

III. VALID PULSE DETECTOR 400

Figures 4, 9:
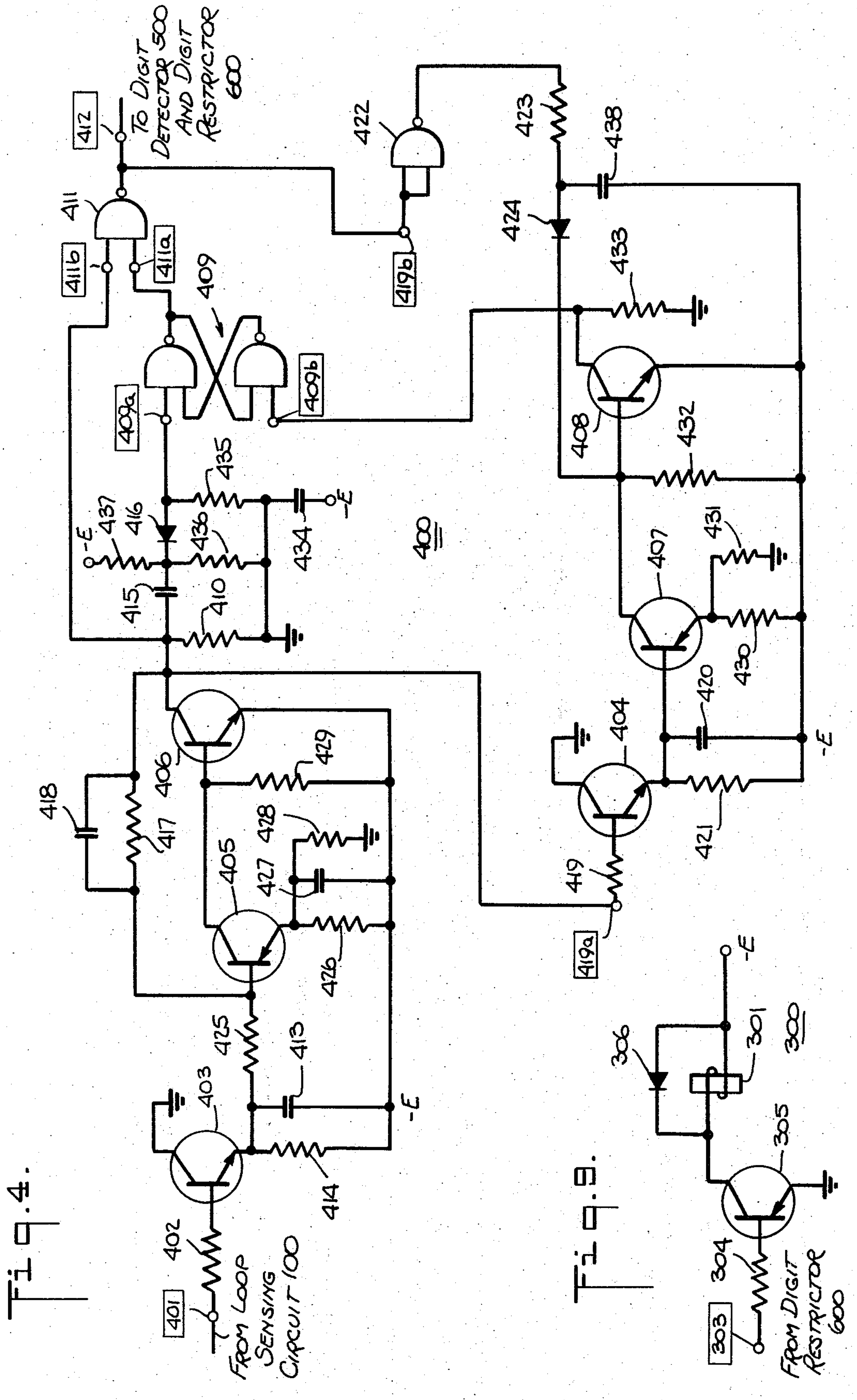
FIG. 4 is a schematic of one embodiment of the valid pulse detector 400, incorporated in the toll restriction circuit of FIG. 1.
FIG. 9 is a schematic of one embodiment of the trunk cut-off relay network 300, incorporated in the toll restriction circuit of FIG. 1.

FIG. 4 is a schematic of the valid pulse detector 400 (FIG. 1). The function of this detector is to generate an output pulse whenever an input pulse coupled thereto had a width lying in a preselected range. Thus, the detector 400, viewed in the time domain, is analogous to a filter, viewed in the frequency domain. In its particular application in the toll restriction circuit (FIG. 1), its parameters are selected so that an output is generated whenever an input pulse has a width in the range of about 20 to 300 msecs., the range of widths of true dial pulses that can be produced by a subset.

As stated above, the output voltage (FIG. 11, waveform E) of the loop sensing circuit 100 (FIG. 1) is coupled to the input port, terminal 401 (FIG. 4), of the pulse detector 400, through resistance 402 to the base electrode of transistor 403. When the subset's dialing apparatus is used, this input signal (FIG. 11, waveform E) includes a train of negative-going pulses, which correspond to dial pulses generated by the subset. In general, the expected width of true dial pulses is in the range T, where $T = t_2 - t_1$, or from about 20 to 300 msecs. (FIG. 11) In the pulse detector's quiescent condition, transistors 403 and 404 are on, because the signal level at their respective base electrodes is at 1 level; transistors 405, 406, 407 and 408 are off. The quiescent state at the output terminal 409*c* of bistable binary element means 409 is 0 level.

Since transistor 406 is off, the voltage drop across its collector electrode load resistance 410 is zero; hence, its collector electrode is at ground potential, a 1 level. The output of binary element 409 and collector electrode potential of transistor 406 are coupled to the first and second terminals 411*a*, 411*b*, respectively, of NAND gate means 411; the combination of 1 and 0 inputs to that gate produces a 1 level output at its quiescent condition. The output of NAND gate 411 is taken as the output of pulse detector 400, at the output port thereof, terminal 412.

An electrical pulse coupled from the loop sensing circuit 100 to the input terminal 401 of detector 400 either has a width in the predetermined range, T, a width less than T, or a width greater than T. These three conditions are considered separately below. Table I shows the pertinent signal levels for these conditions at various points in detector 400.

TABLE I (PERTINENT TO VALID PULSE DETECTOR 400)

| Potential Level At Terminal Point In Detector 400 | Input At Terminal 401: Quiescent | Pulse Width Less Than T | Pulse Width Greater Than T | Pulse Width Within T |
|---|---|---|---|---|
| 403 Base Electrode | 1 | 0 | 0 | 0 |
| 405 Base Electrode | 1 | 1 | 0 | 0 |
| 406 Collector Electrode | 1 | 1 | 0 | 0 |
| 404 Base Electrode | 1 | 1 | 0 | 0 |
| 404 Emitter Electrode | 1 | 1 | 0 | 0 |
| 407 Collector Electrode | 0 | 0 | 1 | 0 |
| 408 Collector Electrode | 1 | 1 | 0 | 1, 1, 0 |
| 409 Binary Output | 0 | 0 | 1, 0 | 1, 1, 0 |
| 411 Nand Gate Output | 1 | 1 | 1 | 1, 0, 1 |

When a negative-going input pulse coupled to terminal 401 has a width less than T, transistor 403 is switched off as a result of the signal level change, from 1 to 0, at its base electrode. Capacitance 413 then discharges through resistance 414. However, the values of components 413 and 414 are so selected that, for this input condition, the base electrode potential of transistor 405 never decreases enought to turn that transistor on. Consequently, nothing further happens in the detector 400; the output of NAND gate 411, hence the pulse detector output at terminal 412, remains at 1 level. Accordingly, a negative-going detector 400 input pulse, of width less than T, produces no change at the pulse detector's output terminal 412.

When a negative-going input pulse coupled to the detector terminal 401 has a width greater than T, the following happens. Transistor 403 again turns off, but now the discharge of capacitance 413 through resistance 414 is sufficient in duration to switch transistor 405 on; the positive-going change in signal level at the collector electrode of transistor 405 switches a means for generating a gating signal, for example, transistor 406 on. The collector electrode potential transistor 406 changes from 1 to 0 level; that change in signal level is coupled through a differentiating network comprising capacitance 415, resistance 436, and diode 416, which blocks positive-going signals, to the "set" terminal 409*a* of binary element 409, thereby gating its output from the quiescent 0 level to 1 level. Since the change from 1 to 0 level at the collector electrode of transistor 406 is also coupled to the second input terminal 411b of NAND gate 411, the NAND gate 411 output remains in the quiescent condition or at 1 level. The collector electrode of transistor 406 is also coupled through a feedback network, comprising resistance 417 and capacitance 418, to the base electrode of transistor 405, to enhance the switching action of transistors 405, 406.

Moreover, the change in signal level at the collector electrode of transistor 406 is also coupled to the first input terminal 419*a* of a means for generating reset signals, which are coupled to the reset terminal 409*b* of binary element 409. This first input signal is coupled through resistance 419 to the base electrode of transistor 404, switching it off. The consequent discharge of capacitance 420 through resistance 421 switches transistor 407 on. The positive-going voltage change at the collector electrode of transistor 407 switches transistor 408 on. The negative-going collector electrode potential of transistor 408 is a first reset signal, generated in response to an input signal at terminal 419*a* whose duration is greater than the upper limit, $t_2$ of true dial pulses. This reset signal is coupled from load resistance 433 to the "reset" terminal 409*b* of binary element 409, gating its output back to 0 level, its quiescent condition. This change of output state of binary element 409, which is coupled to the first input terminal 411*a* of NAND gate 411, does not change the latter's output, which remains in its quiescent condition, at the 1 level.

When the input pulse at terminal 401 finally ends, and the input signal level there returns to the 1 level, transistor 403 is switched on, and transistors 405 and 406 are switched off. The collector electrode potential of transistor 406 returns to 1 level. This change in signal level switches transistor 404 on, thereby switching transistor 407, and then transistor 408 off. Binary element 409 remains in its quiescent condition, hence the output of NAND gate 411 remains at 1 level. Accordingly, a negative-going detector 400 input pulse, of width greater than T, produces no change at the pulse detector's output terminal 412.

When a negative-going input pulse, having a width within the range T, is coupled to the detector's input terminal 401, transistor 403 is switched off, and the discharge of capacitance 413 through resistance 414 again results in switching transistor 405, and then transistor 406, on, as described above. The negative-going signal at the collector electrode of transistor 406 is coupled to the set terminal 409*a* of binary element 409, changing its output state to 1 level. As stated above, the same negative-going signal is coupled to the second input terminal 411*b* of NAND gate 411. Hence, the output level of gate 411 does not change, and remains at 1 level.

Moreover, the negative-going signal from the collector electrode of transistor 406 is also coupled to terminal 419*a*, through resistance 419 to the base electrode of transistor 404, switching it off. However, the time constant of resistance-capacitance network 420, 421 is so selected with respect to the range T, that a "valid" or true dial pulse is never wide enough to hold transistor 404 off long enough, completely to discharge capacitance 420 to effect switching of transistor 407 on. Transistor 407, and hence transistor 408, remain off, when a valid or true dial pulse is coupled to the detector's input terminal 401.

At the end of a valid dial pulse, or a pulse having a width within the range T, the base electrode potential of transistor 403 returns to 1 level; transistor 403 is thereby switched on. Consequently, transistor 405, and then transistor 406, are switched off. The collector electrode potential of transistor 406 returns to 1 level; this signal level change is coupled to the second input terminal 411b of NAND gate 411. Since transistor 408 remained off, binary element 409 was not reset; its output, which is coupled to the first input terminal 411*a* of NAND gate 411, remains at 1 level. Since both iputs to NAND gate 411 are now high, that gate's output switches from 1 to 0 level.

This negative-going signal level change is fed back from output terminal 412 to the second input terminal 419*b* of the means for generating reset signals, which are coupled to the reset terminal 409*b* of binary element 409. This negative-going pulse is coupled from terminal 419*b* to signal inverter 422, which can be a conventional NAND gate whose input terminals are connected together, through resistance 423 and diode 424 to the base electrode of transistor 408, switching it on. The negative-going signal level change at the collector electrode of transistor 408 constitutes a second reset signal, which is coupled to terminal 409*b* of binary element 409. The output of binary element 409 is therefore gated from 1 to 0 level thereby gating the NAND gate 411 output from 0 level back to 1 level, terminating the output pulse at detector output terminal 412.

This positive-going signal level change is also fed back to the base electrode of transistor 408 switching it off. Resistance 423 and capacitance 438 provide a preselected time delay in the feedback path to give the detector 400 output pulse a minimum preselected pulse width. At this time, the pulse detector 400 is in its quiescent condition. Accordingly, a negative-going detector 400 input pulse, of width within the range T, produces a negative-going output pulse of preselected minimum width, at the detector's output terminal 412 (FIG. 11, waveform F). This output pulse occurs at the end of each valid or true dial pulse supplied to input terminal 401.

It is to be noted that detector 400 includes miscellaneous biasing and coupling parameters whose function is well understood by those of skill in the art. For example, resistance 425 couples the emitter electrode of transistor 403 to the base electrode of transistor 405. Resistance-capacitance network 426, 427, 428, resistances 430, 431 and resistances 432, 433 respectively bias transistors 405, 407, and 408. In addition, capacitance 434 and resistances 435, 436, 437 provide an appropriate signal level for diode 416.

IV. DIGIT DETECTOR 500

The input to the pulse train or digit detector 500 is the negative-going output pulse train (FIG. 11, waveform F) generated by the valid pulse detector 400. The function of the digit detector 500 (FIGS. 1, 5A, 5B) is to develop an output pulse at the end of each pulse train corresponding to a digit dialed.

As stated above, each dialed digit comprises a number of pulses. No matter how fast digits are dialed into a subset, the inherent limitations of conventional rotary dial movements, and the physical capability of humans to actuate such dial movements, result in at least a 350 msecs. interval between the last pulse in any digit dialed, and the first pulse in the next digit dialed. The pulse train or digit detector 500 is constructed and arranged to recognize that interpulse interval, and to develop an output signal when it occurs.

Figure 5A:
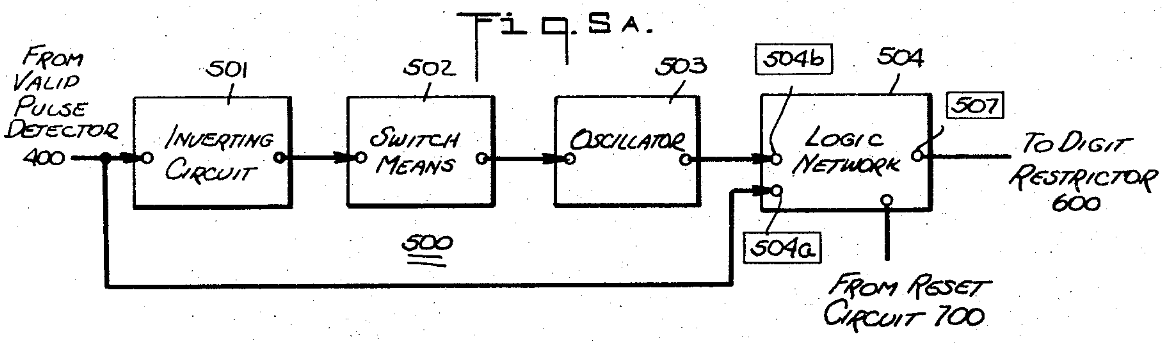
FIGS. 5A and 5B are respectively, a block diagram and a schematic, illustrating one embodiment of the digit detector 500, incorporated in the toll restriction circuit of FIG. 1.

Referring to FIG. 5A, the digit detector 500 includes in tandem connection, a signal inverting circuit 501, an electronic switch means 502, a means 503 for generating a periodic signal having a ramp waveform, including a programmable unijunction transistor (P.U.J.T.) oscillator network, and a first logic network means 504, having first and second input terminals 504*a*, 504*b*, and first and second output states. The output pulse train (FIG. 11, waveform F), generated by the valid pulse detector 400, is coupled to the input terminal of the inverting circuit 501, which can be a conventional NAND gate whose input terminals are coupled together (FIG. 5B), and also to the first input terminal 504*a* of logic network 504.

Figure 5B:
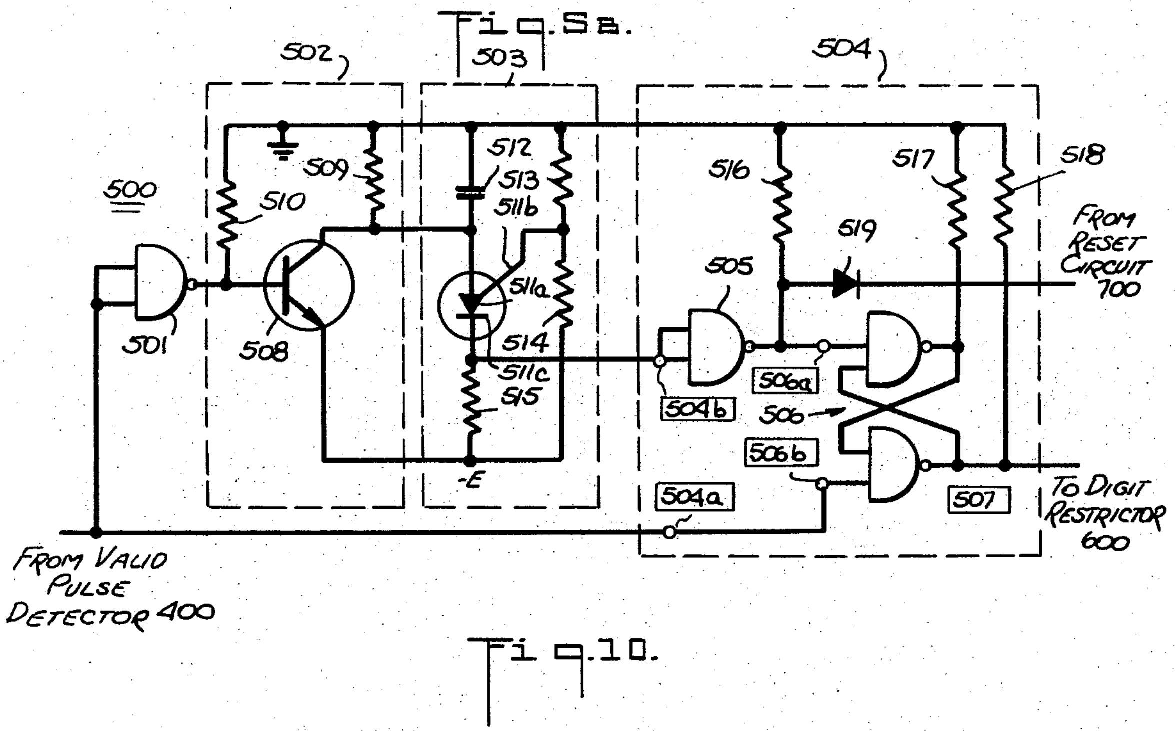

Referring to FIG. 5B, a specific embodiment of digit detector 500, the logic network 504 includes a signal inverting circuit 505, which also can be a conventional NAND gate whose input terminals are coupled together. Signals are coupled to the inverting circuit 505 from the second input terminal 504*b* of logic network 504. The output of inverting circuit 505 is coupled to the reset terminal 506*a* of a bistable binary element 506. The set terminal 506*b* thereof is fed by the valid pulse detector output signal (FIG. 11, waveform F) coupled to the first input terminal 504*a* of logic network 504. The output of binary element 506, at terminal 507, is the output of digit detector 500; in the quiescent state, the output state of binary element 560 is at 0 level, its first output state.

The first pulse in an input signal (FIG. 11, waveform F), coupled from the valid pulse detector 400 to the logic network's first input terminal 504*a*, sets the binary element 506, changing its output from 0 level, to its second output state, 1 level (FIG. 11, waveform L). At the same time, the detector 400 output signal is coupled to the input of inverting circuit 501; each positive-going pulse in the output of inverting circuit 501 (FIG. 11, waveform G) is coupled to the base electrode of transistor 508, which in its quiescent state is biased off by resistances 509, 510. These positive-going pulses switch transistor 508 on; the collector electrode potential of transistor 508 is coupled to a means 503 for generating a periodic signal.

Network 503 comprises a gated semiconductor device 511, a programmable unijunction transistor, whose anode 511*a* is coupled to a charging circuit comprising capacitance 512 and resistance 509, which parameters determine the rise time of the ramp waveform output of the network 503 (FIG. 11, waveform J). The gate 511*b* of device 511 is coupled to a voltage divider comprising resistances 513, 514 which parameters determine the threshold level of conduction of the semiconductor device 511 (FIG. 11, waveform J). The cathode 511*c* of gate 511 is coupled to a negative potential through a resistance 515. The output of the periodic signal generating means 503 is taken at the junction of cathode 511*c* and resistance 515; this output signal is coupled to the second input terminal 504*b* of logic network 504. In the quiescent state, the oscillator network 503 is free running; the parameters thereof are selected to provide an output signal having a natural period of about 350 msecs. (FIG. 11, waveform J), the minimum expected time interval between pulse trains representative of digits dialed at the subset.

When transistor 508 is switched on by the valid pulse detector 400 output signal, the collector electrode potential thereof falls to 0 level, effectively preventing the ramp waveform generated by semiconductor device 511 from reaching the threshold level, and holding that signal at 0 level during the time interval of each output pulse from the detector 400 (FIG. 11, waveform K). Moreover, the time interval between each negative pulse in a single digit train is not large enough to allow the ramp waveform to reach its threshold level before the occurrence of the next pulse in that train. Accordingly, there is no conduction through the semiconductor device 511 during this time interval, hence no signal change at the cathode 511*c* thereof. However, when the inter-pulse train time interval occurs, the ramp waveform voltage reaches the threshold level (FIG. 11, waveform K) providing a reset signal, at the end of the 350 msecs. natural period, which is coupled through inverting circuit 505, to the reset terminal 506*a* of binary element 506. The binary element's output is therby gated from its second output state, 1 level, back to its first output state, 0 level; an output pulse (FIG. 11, waveform L), representative of the fact that a complete digit has been introduced into the valid pulse detector 400, appears at terminal 507. This output signal is coupled from output terminal 507 to the digit restrictor 600.

In addition to biasing resistances 516, 517, 518, logic network means 504 also includes a diode 519, whose anode is connected to the reset terminal 506*a* of binary element 506. The cathode of diode 519 is coupled to the output terminal 703 of reset circuit 700 (FIG. 10). As stated in detail below, the output of reset circuit 700 is a negative-going signal, which inter alia, restores binary element 506 to its quiescent condition, after an electrical disconnection has taken place, either at the subset end or at the central office end of the line.

V. DIGIT RESTRICTOR 600

A. Introduction

Figures 2, 6:
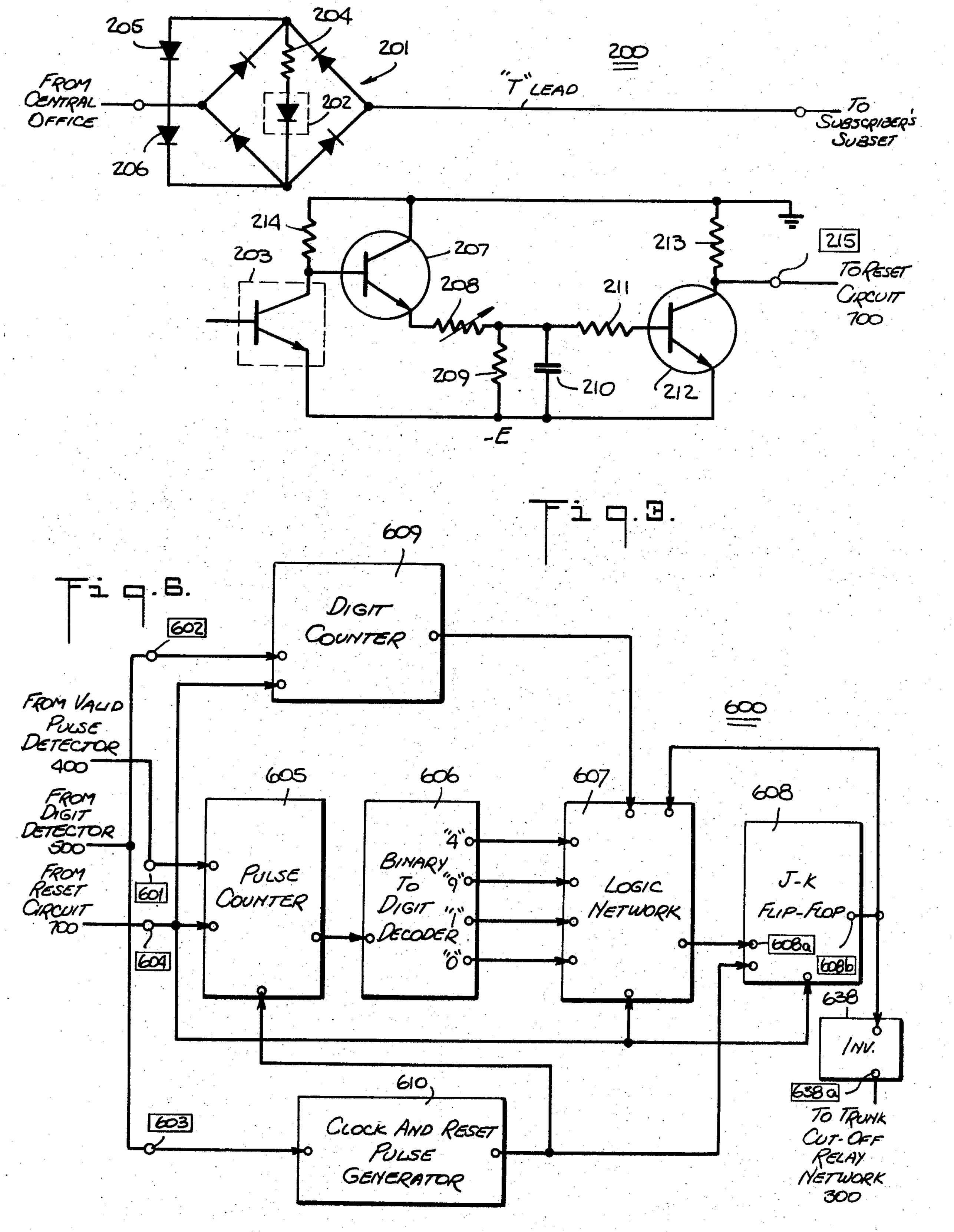
FIG. 6 is a block diagram of one embodiment of the digit restrictor 600, incorporated in the toll restriction circuit of FIG. 1.
Figure 7:
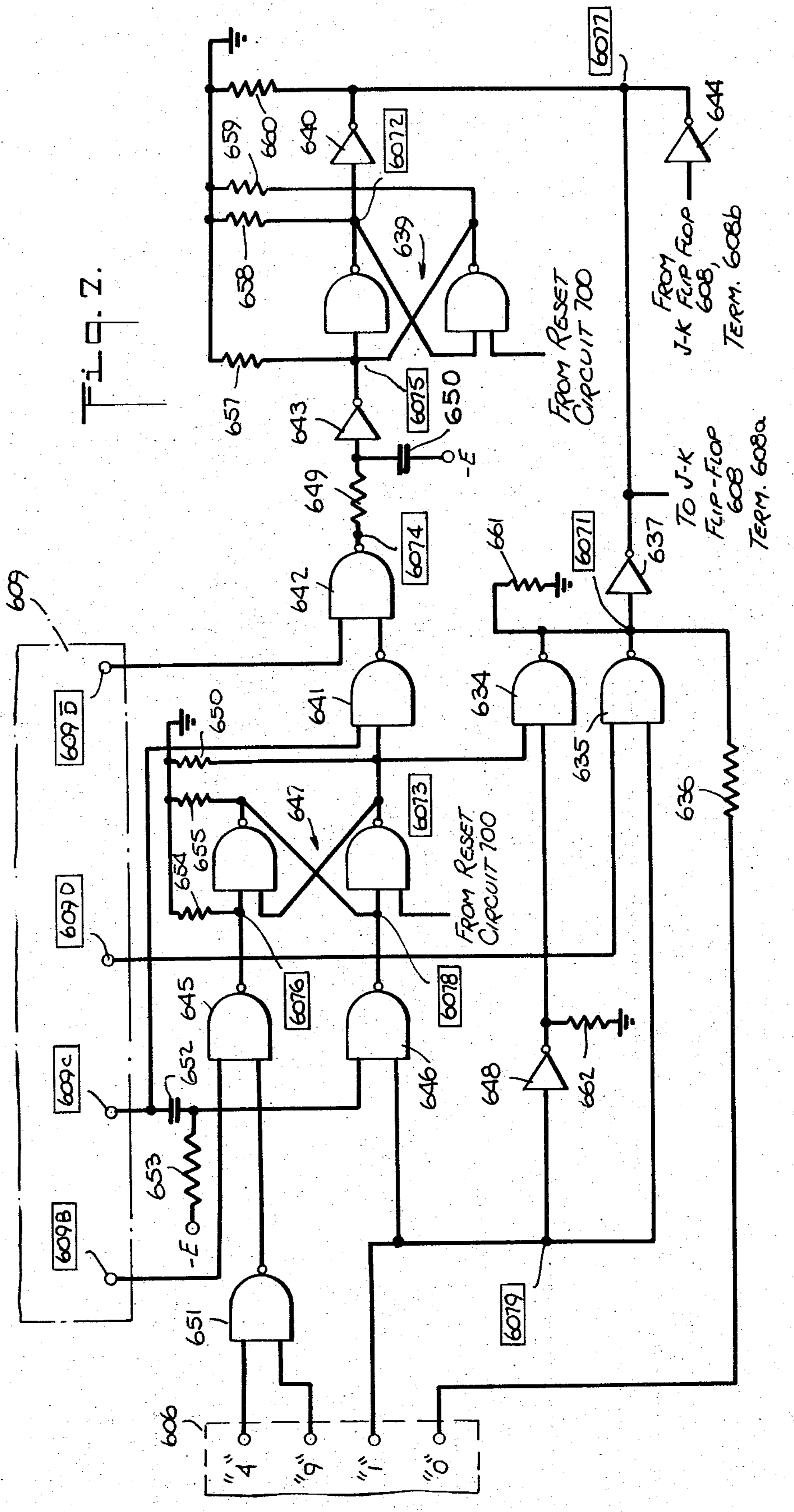
FIG. 7 is a schematic of one embodiment of the logic network 607, incorporated in the digit restrictor 600 of FIG. 6.

The toll restriction circuit embodiment shown in FIG. 1 includes a digit restrictor 600, illustrated in block diagram form in FIG. 6. A specific embodiment of digit restrictor 600 is shown in schematic form in FIG. 8; FIG. 7 is a schematic of one embodiment of the logic network means 607 incorporated therein. Digit restrictor 600 is so constructed and arranged that, in response to signals representative of the dial pulses generated by a subset to be restricted, it determines what specific digits have been dialed (1, 2. . .9, 0), when or in what position each digit occurred (first, second, third), and further, recognizes which combinations of digits should be restricted, and which should not. Moreover, the digit restrictor 500 develops an output signal representative of the foregoing determination; when a restricted combination of digits is recognized, this output signal, which is coupled to the trunk cut-off relay network 300 to energize relay 301 (FIG. 9), effects disconnection of the subset from the central office.

(1). Input Signals

Referring to FIG. 6, three input signals are applied to the digit restrictor 600. The first is the output of valid pulse detector 400 (FIG. 1), a train of negative-going pulses (FIG. 11, waveform F), which pulses correspond on a one-to-one basis to the number of dial pulses generated by the subset and introduced into the toll restriction circuit by the trains, of loop sensing circuit 100 (FIGS. 1, 11, waveform A, C). This input signal, a sequence of electrical pulse trans, is coupled to a first input port, terminal 601 (FIG. 6). The second input to digit restrictor 600 is the output from digit detector 500 (FIG. 1), a train of positive-going pulses (FIG. 11, waveform L), which pulses correspond to the position of occurrence of the digits dialed (first, second, third). This input signal, a signal representative of the last electrical pulse in each train in the sequence of pulse trains supplied to input terminal 601, is coupled to a second input port, comprising terminals 602, 603 (FIG. 6). The third input to the digit restrictor 600 is the electrical output signal generated by the reset circuit 700; this signal is coupled to a third input port, terminal 604, for the purpose of restoring the restrictor 600 to its quiescent state.

The valid pulse detector output signal (FIG. 11, waveform F) is coupled from input terminal 601 to a means for counting the number of electrical pulses in each pulse train supplied to the first input port, comprising a binary coded decimal decade pulse counter 605, which in response thereto generates as its output, a binary coded signal, representative of the number of input pulses counted. This binary coded output signal is coupled to a means for deriving separate signals representative of the number of pulses counted, comprising a binary-to-digit decoder 606. Only four of the output terminals of decoder 606 are utilized in the digit restrictor 600; these are the terminals which correspond to the digits 4, 9, 1 and 0 (FIG. 6). In the quiescent state, the decoder terminals corresponding to the digits 4, 9 and 1 are at 1 level, and the terminal corresponding to the digit 0 is at 0 level. When the binary coded input signal supplied to decoder 606 corresponds to one of these four digits, the voltage at the output terminal corresponding to that digit falls to 0 level; all the other terminals remain at 1 level. The output of decoder 606 is coupled to a second logic network means 607 for supplying signals to the J and K terminals of a J-K flip-flop means 608.

J-K flip-flop means 608 comprises a conventional flip-flop device whose J, K input terminals are tied together. In its quiescent, or reset state, the output of J-K flip-flop 608 is at 0 level. The flip-flop is set by a clock pulse, changing its output state to 1 level, only when a high level signal is coupled to the common J, K input terminals.

(2.) Clock Pulse Generator 610

Figure 8:
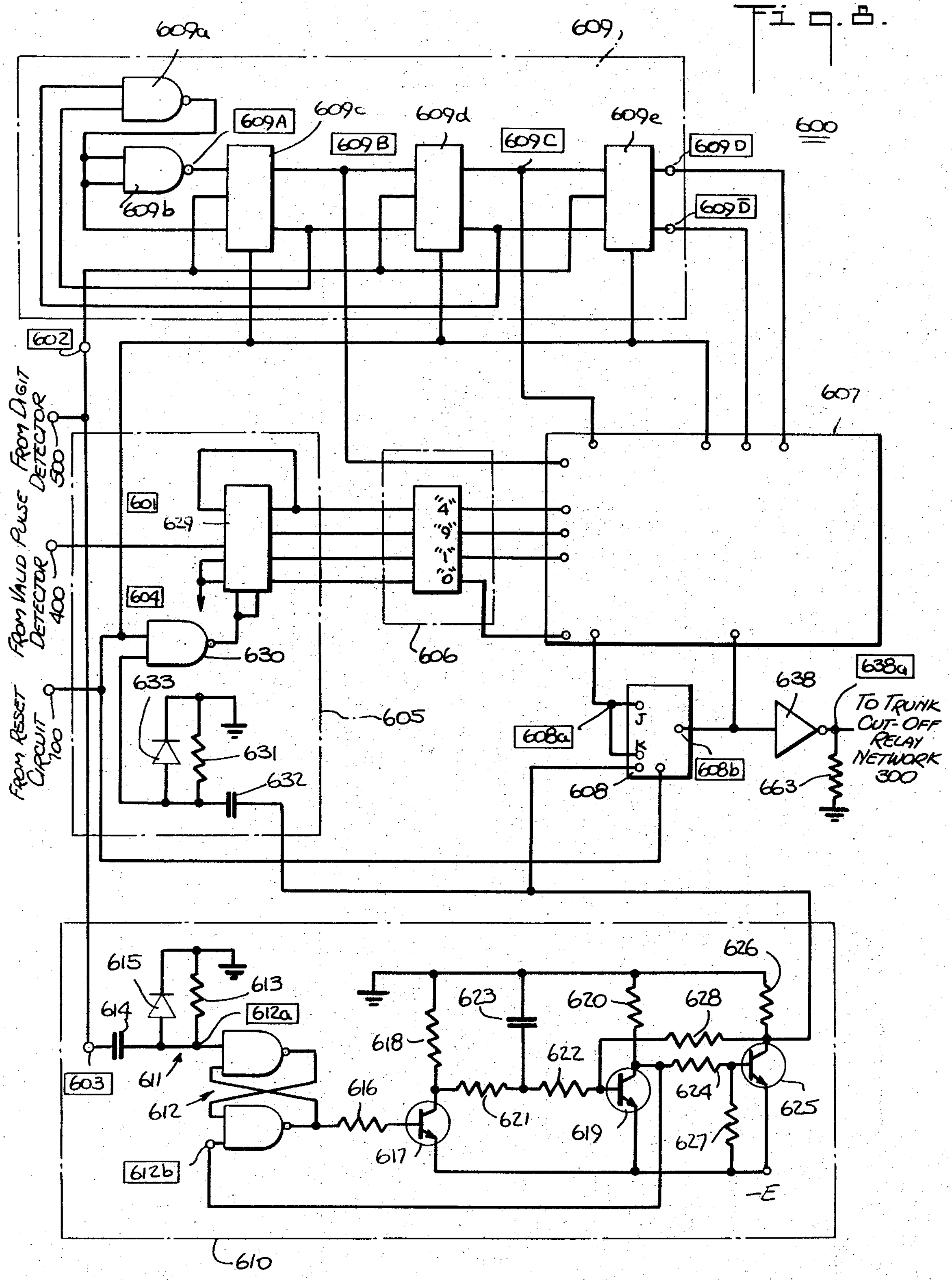
FIG. 8 is a schematic of one embodiment of the digit restrictor 600, incorporated in the toll restriction circuit of FIG. 1.

The digit restrictor 600 includes a first means, coupled to the second input port, at terminal 603, for supplying clock pulses to the flip-flop means 608, and for supplying resetting pulses to the counting means 605. Referring to FIG. 8, this first means comprises clock and reset pulse generator 610, which has an input circuit comprising a differentiating network 611 and a bistable binary element 612.

The differentiating network 611 includes a resistance 613, a capacitance 614, and a diode 615 for clamping positive-going inputs to ground. In its quiescent condition, the output of binary element 612 is at 1 level. Network 611 differentiates the trailing edge of the digit detector output signal (FIG. 11, waveform L) to derive a train of negative-going pulses (FIG. 11, waveform M), which are coupled to the set terminal 612*a* of binary element 612; each negative-going pulse gates the binary element's output to 0 level (FIG. 11, waveform N).

The output of binary element 612 is coupled through resistance 616 to the base electrode of a normally on transistor 617, which has a collector electrode load resistance, 618. In the quiescent state, the collector electrode potential of transistor 617 is at 0 level. When binary element 612 is gated to 0 level, transistor 617 is switched off; its collector electrode potential rises to 1 level (FIG. 11, waveform P).

This change in potential is coupled to the base electrode of normally off transistor 619, which has a collector load resistance 620, through a time delay network comprising resistances 621, 622 and capacitance 623. Sufficient time delay (FIG. 11, waveform Q) is provided by this network to assure that the second logic network means 607 has completed its signal processing functions, and has supplied an output signal to the J-K flip-flop 608, prior to the coupling of a clock pulse from generator 610 to the J-K flip-flop 608.

At the end of the time delay period, transistor 619 is switched on; its collector electrode potential falls from 1 level to 0 level (FIG. 11, waveform R). This change in signal is coupled back to the reset terminal 612*b* of binary element 612, gating its output from 0 level to 1 level (FIG. 11, waveform N). At the same time, the change in collector electrode potential of transistor 619 is coupled through resistance 624 to the base electrode of a normally on transistor 625, which has a collector load resistance, 626, and a biasing resistance, 627. Transistor 625 is switched off; its collector electrode potential rises from 0 level to 1 level (FIG. 11, waveform S). To enhance the switching action of transistors 619, 625, a feedback resistance 628 is coupled between the respective base and collector electrodes thereof.

Moreover, the last-mentioned change in output level of binary element 612, switches transistor 617 on; then, after the period of time delay provided by network 621, 622, 623, transistor 619 is switched off, and transistor 625 switched on. As a result, the generator 625 switched on. As a result, the generator 610 is restored to its quiescent condition; the positive-going pulses thereby developed at the collector electrode of transistor 625 are coupled as clock pulses (FIG. 11, waveform S) to J-K flip-flop 608, and to the pulse counting means 605 as a resetting signal.

(3.) Pulse Counter 605

The pulse counting means 605 comprises a binary coded decimal decade counter 629 (FIG. 8), to which the restrictor input terminal 601 is coupled. A means for resetting the decade counter 629 is also provided; this means includes NAND gate 630, and a differentiating network comprising resistance 631, capacitance 632, and diode 633 for clamping positive-going signals to ground. In the quiescent condition, both inputs to NAND gate 630 are at 1 level; decade counter 629 is reset by gating the output of NAND gate 630 to 1 level. This output change is obtained by either a 0 level signal coupled from reset circuit 700 to restrictor input terminal 604, or by a 0 level signal from the differentiating network 631, 632, 633. In the latter case, the appropriate 0 level signal is obtained when that network differentiates the trialing edge of the pulse output of generator 610 (FIG. 11, waveform S), to develop negative-going reset pulse (FIG. 11, waveform T). This reset pulse occurs after the counting means 605 has counted the electrical pulses in a train supplied to input terminal 601, and before the start of the next pulse train in the sequence supplied to terminal 601.

(4.) Digit Counter

The digit detector output signal (FIG. 11, waveform L) is coupled from the second input port, at terminal 602, to a second means for deriving an output signal representative of the ordinal position of each pulse train in the sequence of pulse trains supplied to terminal 601. This second means comprises a digit counter 609, whch can be a conventional three-state ring counter. As shown (FIG. 8), counter 609 includes conventional NAND gates 609*a*, 609*b*, which are electrically interconnected to conventional J-K flip-flops 609*c*, 609*d*, 609*e*. The truth table (Table II) for counter 609 shows the signal levels at pertinent terminals 609A, 609B, 609C, 609D, 609D̄ during operation of the counter 609, after the occurrence of each digit.

TABLE II (Pertinent To Digit Counter 609)

| | Terminal 609A | 609B | 609C | 609D | 609D̄ |
|---|---|---|---|---|---|
| Quiescent | 1 | 0 | 0 | 0 | 1 |
| 1st Digit | 0 | 1 | 0 | 0 | 1 |
| 2nd Digit | 0 | 0 | 1 | 0 | 1 |
| 3rd Digit | 0 | 0 | 0 | 1 | 0 |

The 1 level signals at terminals 609B and 609C represent the first and second digit pulse trains, respectively, in the sequence of pulse trains coupled to input terminal 601. The 1 level signal at terminal 609D and the 0 level signal at terminal 609D̄ represent the third digit pulse train in the sequence of pulse trains coupled to input termnial 601. The signals at terminals 609B, 609C, 60D, 609D̄ are coupled to the second logic network means 607, for the purpose described below.

B. Unrestricted Combinations of Digits: First digit Not 0, 1, 4 or 9, And Second Digit Not 0 or 1.

The operation of the digit restrictor 600 is best understood by referring to specific combinations of dialed digits, and the signals representative thereof, which are supplied to the digit restrictor 600. The signal levels at pertinent points in the digit restrictor 600, after each digit is dialed are set out in Table III nals applied thereto are at 1 level. Similarly, inverting networks 637, 640, 644, which are biased by resistance 660, are also open collector networks; hence, the potential at the junction of their outputs (terminal 6077, Table III) obtains a 0 level value, if any one of their outputs is at 0 level. Only if all three outputs are high, is the potential at terminal 6077 high.

Referring to FIG. 7, the output condition of NAND gate 634, at the end of the first digit, N, is 1 level, because one input thereto, from inverting network 648, is at 0 level. Similarly, the low level signal coupled from terminal 609D (Table II) of the digit counter 609 to NAND gate 635, gates the latter's output to the 1 level. The high level signal coupled from the 0 digit terminal of binary decoder 606. through resistance 636, establishes the third necessary condition at terminal 6071; the potential at that terminal is at 1 level at the end of the first digit, N.

Since the input to inverting circuit 637 is high level, its output is at 0 level. This low level signal is coupled to the common J-K input terminals (terminal 608*a*, Table III) of J-K flip-flop 608 (FIGS. 6, 8). A clock pulse from generator 610 is subsequently coupled to flip-flop 608, but effects no change in the output state thereof. The potential at its output terminal (terminal 608*b*, Table III) remains at the quiescent condition, i.e., reset or 0 level. This low level signal is coupled to the input of inverting circuit 638 (FIG. 8), whose quiescent output is a high level signal, and is ineffective to energize the trunk cut-off relay circuit 300 (FIG. 9).

TABLE III

Condition A = First digit not "4", "9" or "0"; second digit not "0" or "1".
Condition B = First digit "0".
Condition C = First digit not "4", "9" or "0"; second digit "0" or "1".
Condition D = Codes "411" or "911".
Condition E = Codes "41" or "91"; third digit not "1".
Condition F = First digit "4" or "9"; second digit not "0" or "1".

| Terminal No. | Quiescent | First Digit | | | | | | Second Digit | | | | | | Third Digit | |
|---|---|---|---|---|---|---|---|---|---|---|---|---|---|---|---|
| | | A | B | C | D | E | F | A | C "0" | C "1" | D | E | F | D | E |
| 608A | 0 | 0 | 1 | 0 | 0 | 0 | 0 | 0 | 1 | 1 | 0 | 0 | 0 | 0 | 1 |
| 608b | 0 | 0 | 1 | 0 | 0 | 0 | 0 | 0 | 1 | 1 | 0 | 0 | 0 | 0 | 1 |
| 638a | 1 | 1 | 0 | 1 | 1 | 1 | 1 | 1 | 0 | 0 | 1 | 1 | 1 | 1 | 0 |
| 6071 | 1 | 1 | 0 | 1 | 1 | 1 | 1 | 1 | 0 | 0 | 1 | 1 | 1 | 1 | 0 |
| 6072 | 0 | 0 | 0 | 0 | 0 | 0 | 0 | 1 | 1** | 1** | 0 | 0 | 1 | 1** | 1** |
| 6073 (Q̄) | 1 | 1 | 1 | 1 | 0 | 0 | 0 | 1 | 1 | 1 | 0 | 0 | 1 | 0 | 0 |
| 6074 | 0 | 0 | 0 | 0 | 0 | 0 | 0 | 1 | 1 | 1 | 0 | 0 | 1 | 1 | 1 |
| 6075 | 1 | 1 | 1 | 1 | 1 | 1 | 1 | 0 | 0* | 0* | 1 | 1 | 0 | 0* | 0* |
| 6076 | 1 | 1 | 1 | 1 | 0 | 0 | 0 | 1 | 1 | 1 | 1 | 1 | 1 | 1 | 1 |
| 6077 | 1 | 1 | 1 | 1 | 1 | 1 | 1 | 0 | 0* | 0* | 1 | 1 | 0 | 0* | 0* |
| 6078 | 1 | 1 | 1 | 1 | 1 | 1 | 1 | 0 | 0 | 1 | 1 | 1 | 0 | 1 | 1 |
| 6079 | 1 | 1 | 1 | 1 | 1 | 1 | 1 | 1 | 1 | 0 | 0 | 0 | 1 | 0 | 1 |

* Delayed "0"
** Delayed "1"

The first case to consider is a generalized unrestricted combination of digits, represented by a first digit N, which is other than 0, 1, 4 or 9 and a second digit P, which is other than 0 or 1. In this case, the output signals developed by digit N, from binary decoder 606, are high level signals.

With reference to FIG. 7, it is to be noted that NAND gates 634 and 635, biased by resistance 661, are "open collector" gates. As a result, the potential at the junction of their output terminals and resistance 636 (terminal 6071, Table III) obtains a 0 level value, if any one of the three signals applied to that terminal is at 0 level. The 1 level obtains at that terminal, only if all three sig- Briefly, in response to the second digit dialed (P), bistable binary element 639 (FIG. 7), which is biased by resistances 657, 658, 659, is set; its output (terminal 6072, Table III) is switched from its quiescent condition, 0 level, to 1 level. The output of inverting circuit 640 (terminal 6077, Table III), which is also coupled to the input terminal 608*a* of J-K flip-flop 608, is gated to 0 level. The signal level at this terminal remains at 0 level until binary element 639 is reset by a signal from reset circuit 700. Accordingly, J-K flip-flop 608 is disabled until the digit restrictor 600 is restored to its quiescent state. The flip-flop output (terminal 608*b*) remains at 0 level. The trunk cut-off relay network 300 remains inactive. Hence, the generalized combination of digits just considered is recognized by logic network 607 as an unrestricted combination. That the foregoing result is obtained is now shown in detail.

When the second digit P, is dialed, a high level signal is coupled from terminal 609C of digit counter 609 to one input terminal of NAND gate 641; the quiescent, high level output signal of bistable binary element 647 (taken at the Q terminal thereof, terminal 6073, Table III) is coupled to the other input terminal of NAND gate 641. Accordingly, the output of NAND gate 641 is gated from 1 to 0 level; the output of NAND gate 642 (terminal 6074, Table III) is therefore gated from its quiescent state, 0 level, to 1 level. Thus, the output of inverting circuit 643 (terminal 6075, Table III), coupled to the set terminal of binary element 639, is gated to 0 level, thereby gating the output of that binary element (terminal 6072, Table III) from its quiescent state, 0 level, to 1 level. Hence, the output of inverting circuit 640 is gated from 1 to 0 level, which output holds J-K flip-flop 608 disabled until the digit restrictor 600 is restored to its quiescent state by reset circuit 700.

C. Restricted Combination Of Digits; First Digit 0 or 1

The next situation to consider is a combination to be restricted, i.e., when the first digit dialed is 0 . In this case, the output signal at the 0 digit terminal of decoder 606 is low level.

Because the signal level at terminal 609C of digit counter 609 is low, the output of NAND gate 641 is high; both inputs to NAND gate 642 are therefore high. Thus, the output from inverting network 643 (terminal 6075, Table III) is high, and the output of binary element 639 remains in its quiescent, or reset condition, at 0 level. Hence the output of inverting network 640 (terminal 6077, Table III) is high. At the same time, the low level signal coupled from the 0 digit terminal of the decoder 606, through resistance 636 to the input of inverting network 637 (terminal 6071, Table III), also results a high level output therefrom. J-K flip-flop 608 is enabled by this high level signal at terminal 608*a*.

When J-K flip-flop 608 is subsequently set by a clock pulse from generator 610, its output is gated from its quiescent 0 level to 1 level. This change in signal level is switched to 0 level by inverting network 638, (FIG. 8) which is biased by resistance 663. This inverting network's output (terminal 638*a*, Table III) is coupled to the input terminal 303 of the trunk cut-off relay network 300 (FIG. 9). This low level signal is coupled through resistance 304 to the base electrode of normally off transistor 305, switching it on, thereby energizing relay 301, which is protected from voltage surges by diode 306. The relay's normally closed contacts 302 (FIG. 1) are opened, and the subset to be restricted is disconnected from the central office.

As set forth in detail below, approximately 500 msecs. later, reset circuit 700 generates an output signal to restore the logic network 607 of digit restrictor 600 to its quiescent condition. The signal coupled to terminal 303 (FIG. 9) is thereby raised to 1 level, switching transistor 305 off. Trunk cutoff relay 301 releases, closing contacts 302. The subset is reconnected to the central office (FIG. 1), which again transmits dial tone to it.

The same result obtains in the event that the first digit dialed is 1. In this case, both inputs to NAND gate 634 are at 1 level, hence its output is at 0 level. Thus, the output of inverting network 637 is at 1 level, and flip-flop 608 is thereby enabled. When subsequently set by a clock pulse, the output of flip-flop 608 is gated to 1 level, with the result described above. Referring to Table III, under the heading "First Digit," for "Condition A," the only terminal condition change to be noted is at terminal 6079, where the potential level is at 0 level after the first digit, i.e., 1, is dialed.

D. Restricted Combination Of Digits: First Digit Other Than 0, 1, 4 or 9 And Second Digit 0 or 1.

In the next situation considered, the first digit dialed is any other than 0, 1, 4 or 9, and the second digit dialed is 0 or 1. These also are digit combinations to be restricted. The state obtained by logic network 607 at the end of the first digit has been described above.

Briefly, at the end of the first digit, all the outputs of decoder 606 are at 1 level. The output of NAND gate 651 is at 0 level, hence the output of NAND 645 (terminal 6076, Table III) is at 1 level. The input from terminal 609C to NAND gate 646 is low, hence the output of that gate (terminal 6078, Table III) is also high. Thus, binary element 647 remains in its quiescent or reset condition; its output (terminal 6073, Table III) is at 1 level.

Since the other input to NAND gate 641 is low, the output from that gate is at 1 level. Thus, both inputs to NAND gate 642 are high; the output of that gate (terminal 6074, Table III) is low and the output of inverting network 643 (terminal 6075, Table III) is high. Thus, binary element 639 remains in its quiescent, or reset condition; its output (terminal 6072, Table III) is low, and the output of inverting network 640 (terminal 6077, Table III) is high.

However at that time, the pertinent inputs to NAND gates 634, 635 are low, so that the signal level at their junction (terminal 6071, Table III) is high. Therefore, the output of inverting network 637, and hence the input (terminal 608*a*, Table III) to J-K flip-flop 608, is at O level. Accordingly When a clock pulse is coupled from generator 610 to J-K flip-flop 608, its output remains in the quiescent state, at 0 level.

However, when the second digit dialed is either 0 or 1, the input signal to J-K flip-flop 608 (terminal 608*a*, Table III) rises to 1 level. A subsequent clock pulse from generator 610 sets the J-K flip-flop to energize relay 301 in the manner described above, thereby disconnecting the restricted subset from the central office. That this result is obtained, is shown in detail.

When the second digit dialed is 0, the output from 0 digit terminal of decoder 606 is at 0 level. Accordingly, the input to inverting circuit 637 is at 0 level, and its output is at 1 level, enabling J-K flip-flop 608, which changes its output state (terminal 608*b*, Table III) when a clock pulse is subsequently supplied thereto from generator 610.

At the same time that J-K flip-flop 608 is enabled, high level inputs are applied to NAND gate 641 from binary element 647 (terminal 6073, Table III), and digit counter output terminal 609C, switching that gate's output to low level. The output of NAND gate 642 (terminal 6074, Table III) is thereby switched to high level. A time delay network comprising resistance 649 and capacitance 650 delays transmission of this signal level change to inverting network 643, whose output (terminal 6075, Table III) changes to 0 level at the end of that period of delay, setting binary element 649 to establish a high level signal at its output (terminal 6072, Table III). The output of the inverting network 640 (terminal 6077, Table III) becomes low level. However, because of the time delay imposed by network 649, 650, this change in signal level does not occur until after the J-K flip-flop 608 has been set by the clock pulse, to change its output state to 1 level to energize relay 301 (FIG. 9).

Similarly, when the second digit dialed is 1, the 1 digit output terminal of decoder 606 falls to the 0 level; the output of inverting network 648 then rises to 1 level. Hence both inputs to NAND gate 634 are high level signals, and its output is gated to 0 level. For the reasons set forth above, the input to J-K flip-flop 608 (terminal 608*a*, Table III) rises to 1 level. Moreover, the setting of binary element 639 is again delayed long enough to allow J-K flip-flop 608 to be set by a clock pulse from generator 610, thereby gating the flip-flop's output to 1 level to energize relay 301 (FIG. 9).

In brief review, it has been shown how digit restrictor 600, and particularly the logic network 607 therein, operate to restrict dialed calls (a) where the first or second digit dialed is 0 or 1, and (b) where the second digit dialed is 1, and the first digit dialed is neither 4 or 9. It is now shown below how digit restrictor 600 embodiment shown in FIGS. 7,8 functions to allow dialing, without restriction, of the information and emergency codes, 411 and 911 respectively. It is to be understood by those skilled in the art, that this feature can be deleted without affecting the restriction functions performed by digit restrictor 600 in respect of other combinations of digits.

E. Unrestricted Combinations Of Digits: Codes 411 and 911

When the first digit dialed is either 4 or 9, the output from either the 4 or 9 digit terminals of decoder 606 is a low level signal. Therefore the output of NAND gate 651 is switched from its quiescent 0 level to 1 level. Thus, both inputs to NAND gate 645 are now high level signals; the resulting 0 level output from NAND gate 645 is coupled to the set terminal (terminal 6076, Table III) of binary element 647, which is biased by resistances 654, 655, 656. This binary element's output (terminal 6073, Table III) is thereby gated to 0 level.

At the same time, NAND gates 634, 635 remain in their quiescent conditions, with 1 level outputs; hence, the input signal level (terminal 6071, Table III) to inverting network 637 is high. The output of that network is therefore low. Accordingly, J-K flip-flop 608 remains in its quiescent state; when a clock pulse is coupled thereto from generator 610, its output (terminal 608B, Table III) remains at 0 level.

When the second digit dialed is 1, the signal at the 1 digit terminal of decoder 606 becomes low level; thus, the output of NAND gate 646 (terminal 6078, Table III) remains high, and binary element 647 remains in the set condition. Since its output (terminal 6073, Table III) in this condition is low, the output of NAND gate 634 remains high. Since the output of NAND gate 635, and the output of the 0 digit terminal of decoder 606 (terminal 6071, Table III) also remain high, the output of inverting circuit 637 (terminal 608*a*, Table III) remains low.

Moreover, since both inputs to NAND gate 642 remain at 1 level, its output (terminal 6074, Table III) remains at 0 level; the input to binary element 639 (terminal 6075, Table III) therefore remains high. Accordingly, that binary element remains in its quiescent reset condition, at 0 level. When the next clock pulse is coupled to the still disabled J-K flip-flop 608, its output (terminal 608*b*, Table III) remains at 0 level.

When the third digit dialed is also 1, the output from NAND gate 645 (terminal 6078, Table III) remains high, and binary element 647 remains in the set condition. Its output remains low, hence, the signal level at the input of inverting network 637 (terminal 6071, Table III) remains at 1 level; its output (terminal 608*a*, Table III) remains low. However, the signal level at output terminal 609$\bar{D}$ of digit counter 609 falls to low level. Hence, the output of NAND gate 642 (terminal 6074, Table III) rises to 1 level. This signal change is delayed by time delay network 649, 650; after that delay, the output of inverting network 643 (terminal 6075, Table III) falls to 0 level, setting binary element 639. The output of binary element 639 (terminal 6072, Table III) becomes high; the output of inverting network 640 (terminal 6077, Table III) then falls to 0 level, disabling the J-K flip-flop 608, until a reset pulse is coupled to the digit restrictor from reset circuit 700.

F. Restricted Combination Of Digits 41 or 91 With Third Digit Not 1

However, digit restrictor 600 is effective to restrict calls when the first and second digits dialed are 41 or 91, but the third digit dialed is a number other than 1. When the third digit in these sequences is any number other than 1, the call must be restricted, because the code dialed is an area code. The conditions obtained by logic network 607, when the first two digits dialed are 41 or 91 have already been described.

When the third digit dialed is not 1, the output from the 1 digit terminal of decoder 606 and the output of the 609D terminal of digit counter 609 are at 1 level. These signals are the inputs to NAND gate 635, whose output (terminal 6071, Table III) is thereby gated to 0 level. The output of inverting network 637 is therefore high, and J-K flip-flop 608 is enabled.

Although dialing of the third digit results in the gating of the output of NAND gate 642 (terminal 6074, Table III) to 1 level, time delay network 649, 650 delays the setting of binary element 639, so that the output of inverting network 640 (terminal 6077, Table III) remains high, until after a clock pulse is coupled from generator 610 to J-K flip-flop 608. At that time, the output of J-K flip-flop 608 (terminal 608*b*, Table III) is gated to 1 level, the output (terminal 638*a*, Table III) of inverting network 638 falls to 0 level, the transistor 305 (FIG. 9) is switched on, and the relay 301 energized to disconnect the subset from the central office.

G. Unrestricted Combination Of Digits: First Digit 4 or 9 Second Digit Not 0 or 1.

One last condition is to be noted, the situation where 4 or 9 is the first digit dialed, and some digit other than 0 or 1 is the second digit. This combination is not to be restricted; hence J-K flip-flop 608 must be disabled. Briefly, this result is effected by setting binary element 639.

The conditions obtained by logic network 607, when the first digit dialed is 4 or 9 have already been described. When the second digit is neither 0 or 1, the outputs from the 0 and 1 digit terminals of decoder 606 are high. Moreover, the signal at the 609C terminal of digit counter 609 is also high. This signal change from low to high is differentiated by capacitance 652 and resistance 653, and appears as a short 1 level signal at one input of NAND gate 646. At this time, the signal at its other input terminal is also high; its output (terminal 6078, Table III) falls to 0 level, resetting binary element 647, whose output terminal 6073, Table III) rises to 1 level.

Therefore, both inputs to NAND gate 641 are high; its output is low. Thus, the output of NAND gate 642 (terminal 6074, Table III) is high, and the output of inverting network 643 (terminal 6075, Table III) is low, setting binary element 639. The output of binary element 639 (terminal 6072, Table III) rises to 1 level, and the output of inverting network 640 (terminal 6077, Table III) falls to 0 level. Hence, the input to J-K flip-flop 608 (terminal 608*a*) is low. Therefore, J-K flip-flop 608 is disabled, and remains so until the digit restrictor 600 is restored to its quiescent state by reset circuit 700.

VI. RESET CIRCUIT

FIG. 10 is a schematic of one embodiment of the reset circuit 700 (FIG. 1). In its quiescent state, the output of reset circuit 700 (terminal 703) is at 1 level. The function of the reset circuit 700 to restore digit detector 500 and digit restrictor 600 to their quiescent states. In the quiescent state of reset circuit 700, a voltage divider comprising resistances 704, 705 biases the emitter electrode of transistor 706 to cut-off. Accordingly, the potential at the base electrode of transistor 707 is at 0 level, and that transistor is also cut-off. The potential at the collector electrode of transistor 707, and hence at output terminal 703, is at 1 level.

The output of loop sensing circuit 100 (FIGS. 1, 2, 11, waveform E) is coupled to reset circuit input terminal 701 (FIG. 10). That input signal is coupled through resistance 708 to the base electrode of normally on transistor 709, switching it off and on, in one-to-one correspondence with the number of dial pulses represented by that input signal. The emitter electrode of transistor 709 is connected to an integrating circuit, comprising resistance 710, capacitance 711, and diode 712. The anode of diode 712 is coupled to the junction of the resistance 713, the capacitance 717, and the anode of diode 719, and the base electrode of transistor 706. The time constant of the integrating circuit is so selected, that dial pulses (FIG. 11, waveforms B, E) are not wide enough sufficiently to lower the potential, at the base electrode of transistor 706, enough to switch that transistor on; a preferred value of this time constant is about 500 msecs.

However, an on-hook signal (FIG. 11, waveform E) of at least 500 msecs. duration is sufficient to lower the potential at the base of transistor 706 to initiate conduction. When transistor 706 is switched on, current flow through resistance 714 produces a positive-going change of potential at its collector electrode, which initiates conduction of transistor 707. When transistor 707 is switched on, the current flow through resistance 715 produces a negative-going change in potential at its collector electrode (FIG. 11, waveform U); this potential change from 1 to 0 level is coupled from output terminal 703 to digit detector 500 (FIG. 5B), and digit restrictor 600. (FIGS. 6-8) Resistance 716 provides feedback between the collector electrode of transistor 707 and the base electrode of transistor 706, to enhance their switching action. In this embodiment of the reset circuit 700, capacitance 717 provides neutralization, and capacitance 718 provides an appropriate by-pass path for a-c signals.

Reset circuit 700 is also responsive to the output of sensing circuit 200 (FIG. 3); this signal is coupled to input terminal 702. (FIG. 10) As stated above, when the central office disconnects from the T and R leads, a negative-going pulse (FIG. 12, waveform EE) is coupled from the sensing circuit 200 output terminal 215 to reset circuit input terminal 702, through diode 719 to the base electrode of transistor 706, switching that transistor on to generate a negative-going reset pulse at output terminal 703. In either case, i.e., after a response to the output of sensing circuit 100 or a response to the output of sensing circuit 200, the reset circuit returns to its quiescent condition when the subset goes into its off-hook condition.

CONCLUSION

The components incorporated in the particular embodiment of toll restriction circuit, described above with reference to FIGS. 2–4, 5B and 7–10, are set forth in Table IV. A suitable power supply voltage, "E" for this arrangement of components is about −5 volts d-c. The same, or different, voltage supply can be used to power the cut-off relay 301 (FIG. 9). The components of the specific embodiments herein described are selected to assure operation of the toll restriction circuit in a temperature range from about 0° to +55° C. The component codes "AT1" and "AT2" given below for optoelectronic devices 202, 203 and 102, 103 respectively, can be TI-111, sold by Texas Instrument, Inc., or Iso-Lit 1, sold by Litronix, Inc.

TABLE

| Component | Value or Code* | Component | Value or Code* | Component | Value or Code* |
|---|---|---|---|---|---|
| 101 (4) | 1N4004 | 102,103 | AT2 | 104 | 10 ohms |
| 105 | 1N4004 | 106 | 1N4004 | 107 | 10K ohms |
| 108 | 5.6K ohms | 109 | 5.6K ohms | 110 | 2N5356 |
| 111 | 5.6K ohms | 112 | 10K ohms | 113 | 1N4148 |
| 201 (4) | 1N4004 | 202,203 | AT1 | 204 | 10 ohms |
| 205 | 1N4004 | 206 | 1N4004 | 207 | 2N5308 |
| 208 | 75K ohms | 209 | 150K ohms | 210 | 0.47 uf |
| 211 | 22K ohms | 212 | 2N5308 | 213 | 5.6K ohms |
| 214 | 560K ohms | 304 | 560 ohms | 305 | 2N2907 |
| 306 | 1N4004 | 402 | 5.6K | 403 | 2N5232 |
| 404 | 2N5232 | 405 | 2N5356 | 406 | 2N5232 |
| 407 | 2N5356 | 408 | 2N5232 | 409 | SN7400 |
| 410 | 5.6K ohms | 411 | SN7400 | 413 | 0.47 uf |
| 415 | 0.01 uf | 416 | 1N4148 | 417 | 220K ohms |
| 418 | 100 pf | 419 | 5.6K ohms | 420 | 6.8 uf |
| 422 | SN7400 | 423 | 560 ohms | 424 | 1N4148 |
| 425 | 22K ohms | 426 | 5.49K ohms | 427 | 6.8 uf |
| 428 | 5.6K ohms | 429 | 22K ohms | 430 | 5.49K ohms |
| 431 | 5.49K ohms | 432 | 22K ohms | 433 | 5.6K ohms |
| 434 | 0.01 uf | 435 | 10K ohms | 436 | 100K ohms |
| 437 | 560K ohms | 438 | 6.8 uf | 501 | SN7403 |

TABLE – Continued

| Component | Value or Code* | Component | Value or Code* | Component | Value or Code* |
|---|---|---|---|---|---|
| 505 | SN7403 | 506 | SN7403 | 508 | 2N5232 |
| 510 | 2.7K ohms | 511 | 2N6027 | 512 | 0.94 uf |
| 513 | 5.49K ohms | 514 | 5.49K ohms | 515 | 560 ohms |
| 516 | 5.6K ohms | 517 | 5.6K ohms | 518 | 5.6K ohms |
| 519 | 1N4148 | 606 | SN7442 | 609 | SN7473 |
| 613 | 10K ohms | 614 | 0.01 uf | 615 | 1N4148 |
| 616 | 5.6K ohms | 617 | 2N5232 | 618 | 10K ohms |
| 619 | 2N5308 | 620 | 2.7K ohms | 621 | 1K ohm |
| 622 | 6.8K ohms | 623 | 0.47 uf | 624 | 5.6K ohms |
| 625 | 2N5232 | 626 | 5.6K ohms | 627 | 2.7K ohms |
| 628 | 100K ohms | 629 | SN7490 | 631 | 10K ohms |
| 632 | 0.01 uf | 633 | 1N4148 | 636 | 360 ohms |
| 649 | 470 ohms | 650 | 10 uf | 652 | 0.01 uf |
| 653 | 470 ohms | 654 | 5.6K ohms | 655 | 5.6K ohms |
| 656 | 5.6K ohms | 657 | 5.6K ohms | 658 | 5.6K ohms |
| 659 | 5.6K ohms | 660 | 5.6K ohms | 661 | 5.6K ohms |
| 662 | 5.6K ohms | 663 | 5.6K ohms | 704 | 5.49K ohms |
| 705 | 5.49K ohms | 706 | 2N5356 | 707 | 2N5232 |
| 708 | 5.6K ohms | 709 | 2N5232 | 711 | 6.8 uf |
| 712 | 1N4148 | 713 | 180K ohms | 714 | 22K ohms |
| 715 | 5.6K ohms | 716 | 150K ohms | 717 | 100 pf |
| 718 | 6.8 uf | 719 | 1N4148 | | |

*Unless otherwise indicated, parameter values are given in ohms and microfarads (uf)

Although the specifically disclosed embodiments of toll restriction circuits, constructed in accordance with the invention, are designed to restrict placement of calls to exchanges numbered in accordance with the plan adopted by the Bell System, it is apparent to one of skill in the art that these circuits, with appropriate modification, can be used to restrict calls to exchanges numbered in accordance with any plan.

Moreover, although the specific embodiments disclosed allow dialing of codes 411 and 911 from a subset to be restricted, it is apparent to those of skill in the art that the toll restriction circuit can be appropriately modified to delete provision of this feature, without affecting the basic toll dialing restriction functions.

Thus, in accordance with the invention, a novel method of restricting a preselected subset to prevent placing toll calls, and novel apparatus for performing the functions required to prevent placing toll calls from a preselected subset, have been described in detail above.

Furthermore, with reference to specifc novel circuits described above in detail, those of skill in the art appreciate that such circuits have utility in environments other than toll restriction circuits. For example, sensing circuits 100, 200 are useful as coupling networks at any point in a telephone system where it is desired to achieve unidirectional coupling. Moreover, the electrical pulse detector 400 is suitable for use in any environment where it is desired to "filter" pulses of preselected widths from a plurality of input pulses having a range of widths. Similarly, the electrical pulse train detector 500 is suitable for use in any environment, in which it is desired to discriminate among trains of pulses having different lengths, and a specified inter-train interval. After study of the specifications hereof, other uses of the novel circuits described herein readily suggest themselves to those of skill in the art.

While specific embodiments of the invention have been disclosed, variations in procedural and structural detail within the scope of the appended claims, for example, the use of "negative" logic networks instead of "positive" logic networks, are possible and are contemplated. There is, therefore, no intention of limitation to the abstract, or the exact disclosure herein presented.

What we claim is:

1. A toll restriction circuit for preventing the placement of unauthorized toll calls from a preselected subset connected to a telephone central office by a pair of wires, said circuit comprising:

means, electrically connected to at least one of said wires, for electrically coupling the signals transmitted on said pair of wires, including at least the electrical pulse train representative of digits dialed at said subset to the next-mentioned optoelectronic device means;

optoelectronic device means, responsive to said coupled signals, for deriving a light output signal representative of said coupled signals;

means, responsive to said light output signal, for generating an electrical pulse for each light pulse occurring in said light output signal, and having a width in a preselected range of widths, said preselected range corresponding to the range of widths of dial pulses in said electrical pulse train;

means for coupling said generated pulses to the next-mentioned first and second means;

first means and second means responsive to said generated pulses, said first means for generating and supplying an electrical signal to said second means, said electrical signal being representative of the ordinal position of digits dialed at said subset, and said second means, being constructed and arranged to combine the inputs thereto, for determining whether digits dialed at said subset constitute a dialing code to be restricted, and for generating an output signal representative of said determination;

the combination being so constructed and arranged that an output signal, representative of the determination that a dialing code to be restricted has been dialed, is generated when the first digit dialed is 0, or when the second digit dialed is 0 or 1.

2. The toll restriction circuit according to claim 1 further including means, responsive to said output signal, for electrically disconnecting said subset from said central office, when the digits dialed at said subset constitute a dialing code to be restricted.

3. A toll restriction circuit for preventing the placement of unauthorized toll calls from a preselected subset connected to a telephone central office by a pair of wires, said circuit comprising:

means, electrically connected to at least one of said wires, for electrically coupling the signals transmitted on said pair of wires, including at least the electrical pulse train representative of digits dialed at said subset, to said next-mentioned device means; said coupling means including a first optoelectronic device means, having an input electric port and an output optic port, for deriving a light output signal at said optic port representative of said coupled signals;

first means for converting said light output signal into a first electrical signal;

means, responsive to said first electrical signal developed by said converting means, for generating an electrical output pulse for each electrical pulse occurring in said first electrical signal, and having a width in a preselected range of widths, said preselected range corresponding to the range of widths of dial pulses in said electrical pulse train;

means for coupling said generated pulses to the next-mentioned first and second means;

first means and second means responsive to said generated pulses, said first means for generating and supplying a second electrical signal to said second means, said second electrical signal being representative of the ordinal position of digits dialed at said subset, and said second means including logic network means, being constructed and arranged to combine the inputs thereto, for determining whether the digits dialed at said subset constitute a dialing code to be restricted, and for generating an output signal representative of said determination;

the combination being so constructed and arranged that an output signal, representative of the determination that a dialing code to be restricted has been dialed, is generated when the first digit dialed is 0, or when the second digit dialed is 0 or 1.

4. The toll restriction circuit according to claim 3 further including means, responsive to said output signal, for electrically disconnecting said subset from said central office, when the digits dialed at said subset constitute a dialing code to be restricted.

5. The toll restriction circuit according to claim 3 wherein said converting means includes a second optoelectronic device means, having an input optic port to which said light output signal is coupled, and an output electric port at which said first electrical signal appears.

6. The toll restriction circuit according to claim 3 wherein said electrical output pulse generating means comprises:

an electrical input port to which said first electrical signal is supplied;

an electrical output port;

NAND gate means for generating an output pulse, said means having first and second input terminals and an output terminal;

means for coupling said output terminal to said output port;

bistable binary element means having set and reset input terminals and at least one output terminal;

means for coupling said one output terminal to the first input terminal of said NAND gate means;

first means, responsive to said first electrical signal, for generating a gating signal when the width of an electrical pulse, occurring in said first electrical signal, exceeds a first preselected value, the duration of said gating signal being substantially equal to the width of said electrical pulse;

means for coupling said gating signal to the second input terminal of said NAND gate means;

second means, having first and second input terminals, for generating a first reset signal in response to an input signal at said first terminal, when said input signal has a duration greater than a second preselected value, and for generating a second reset signal in response to an input signal at said second input terminal;

means for coupling said gating signal to said first input terminal of said second means;

means for coupling the output terminal of said NAND gate means to said second input terminal of said second means; and means for coupling said reset signals to said reset input terminal;

the combination being so constructed and arranged that an output pulse is generated at said output port when an electrical pulse, having a width within the range defined by said first and second preselected values, occurs in said first electrical signal supplied to said input port.

7. The toll restriction circuit according to claim 3 wherein said first means responsive to said electrical output pulses comprises:

first logic network means having first and second input terminals and first and second output states;

first means for coupling said electrical output pulses of said electrical pulse generating means to said first input terminal, and to the next-mentioned generating means;

means, responsive to said electrical output pulses, for generating a resetting signal during the time interval between successive electrical pulse trains representative of digits dialed at said subset; and second means for coupling said resetting signal to said second input terminal;

the combination being so constructed and arranged that the output of said first logic network means is gated from said first output state to said second output state, in response to the first electrical output pulse supplied to said first input terminal, thereby indicating the occurrence of the first pulse in a digit dialed, and subsequently from said second output state back to said first output state, in response to said resetting signal supplied to said second input terminal, thereby indicating the occurrence of the last pulse in said digit.

8. The toll restriction circuit according to claim 7 wherein said generating means comprises:

semiconductor device means having anode, cathode and gate electrodes, and terminals corresponding thereto, said coupling means being electrically connected to said anode electrode terminal;

integrating circuit means coupled to said anode electrode terminal;

voltage dividing circuit means coupled to said gate electrode terminal;

load impedance means coupled to said cathode electrode terminal, and having an output terminal electrically connected by said second coupling means to said second input terminal;

the enumerated means being so proportioned, and the combination being so constructed and arranged that (a) conduction between said anode and cathode electrodes is prevented at least during the occurrence of each electrical pulse train representative of a digit dialed at said subset, and (b) conduction between said anode and cathode electrodes is allowed to occur at least during said interval between successive pulse trains representative of digits dialed at said subset, thereby to generate said resetting signal at said load impedance output terminal.

9. The toll restriction circuit according to claim 8 wherein said second means responsive to said electrical output pulses comprises:

J-K flip-flop means having its J and K input terminals electrically connected together;

means for supplying clock pulses to said flip-flop means;

second logic network means for supplying signals to said J and K terminals;

means for counting the number of said electrical output pulses produced by said electrical pulse generating means;

means, responsive to said counting means, for deriving at least separate output signals representative of the count of one, four, nine and ten pulses, respectively;

means for coupling said last-mentioned output signals to said second logic network means;

means, responsive to the output of said first logic network means, for deriving separate signals representative of the occurrence of the first, second and third digits dialed; and means for coupling said last-mentioned digit representative signals to said second logic network means;

the combination being so constructed and arranged that said flip-flop means is enabled, and changes its output state in response to a clock pulse, when the first digit in a dialed sequence is 0 or 1, or when the second digit in a dialed sequence is 0 or 1, except when the first digit dialed in said last-mentioned sequence is 4 or 9, and the second and third digits are 1.

10. The toll restriction circuit according to claim 9 further including means, responsive to the output state of said flip-flop means, for electrically disconnecting said subset from said central office when said flip-flop means is enabled, and the output state thereof changes in response to a clock pulse.

11. The toll restriction circuit according to claim 10 further including means, responsive to a supplied on-hook electrical signal of preselected duration, for generating and supplying a resetting signal to said first and second logic network means to restore said network means to their respective quiescent states.

12. The toll restriction circuit according to claim 11 wherein said electrical output pulse generating means comprises:

an electrical input port to which said first electrical signal is supplied;

an electrical output port;

NAND gate means for generating an output pulse, said means having first and second input terminals and an output terminal;

means for coupling said output terminal to said output port;

bistable binary element means having set and reset input terminals and at least one output terminal;

means for coupling said one output terminal to the first input terminal of said NAND gate means;

first means, responsive to said first electrical signal, for generating a gating signal when the width of an electrical pulse, occurring in said first electrical signal, exceeds a first preselected value, the duration of said gating signal being substantially equal to the width of said electrical pulse;

means for coupling said gating signal to the second input terminal of said NAND gate means;

second means, having first and second input terminals, for generating a first reset signal in response to an input signal at said first terminal, when said input signal has a duration greater than a second preselected value, and for generating a second reset signal in response to an input signal at said second input terminal;

means for coupling said gating signal to said first input terminal of said second means;

means for coupling the output terminal of said NAND gate means to said second input terminal of said second means; and means for coupling said reset signals to said reset input terminal;

the combination being so constructed and arranged that an output pulse is generated at said output port when an electrical pulse, having a width within the range defined by said first and second preselected values, occurs in said first electrical signal supplied to said input port.

13. The toll restriction circuit according to claim 12 which further comprises:

means, electrically connected to the other of said wires, for supplying a portion of the signals transmitted on said pair of wires from said central office to said subset, including at least the signal representative of the electrical disconnection of said central office from said subset, said supplying means including a third optoelectronic device means, having an input electric port and an output optic port, for deriving a light output signal at said optic port representative of said supplied signals;

means, including a fourth optoelectronic device means, having an input optic port to which said last-mentioned light output signal is coupled, and an output electric port, for converting at least the portion of said derived light output signal constituting said electrical disconnection representative signal into a third electric signal; and means for supplying said third electrical signal to said resetting signal generating and supplying means;

the combination being so constructed and arranged that said resetting signal generating and supplying means is operative to restore said first and second logic network means to their respective quiescent states, when an electrical signal representative of the electrical disconnection of said central office from said subset is transmitted on said pair of wires.

14. An electrical pulse detector comprising:

an electrical input port to which electrical pulses are supplied;

an electrical output port;

NAND gate means for generating an output pulse, said means having first and second input terminals and an output terminal;

means for coupling said output terminal to said output port;

bistable binary element means having set and reset input terminals and at least one output terminal;
means for coupling said one output terminal to the first input terminal of said NAND gate means;
first means, responsive to electrical pulses supplied to said input port, for generating a gating signal when the width of a supplied electrical pulse exceeds a first preselected value; the duration of said gating signal being substantially equal to the width of said electrical pulse;
means for coupling said gating signal to the second input terminal of said NAND gate means;
second means, having first and second input terminals, for generating a first reset signal in response to an input signal at said first terminal, when said input signal has a duration greater than a second preselected value, and for generating a second reset signal in response to an input signal at said second input terminal;
means for coupling said gating signal to said first input terminal of said second means;
means for coupling the output terminal of said NAND gate means to said second input terminal of said second means; and
means for coupling said reset signals to said reset input terminal;
the combination being so constructed and arranged that an output pulse is generated at said output port when an electrical pulse, having a width within the range defined by said first and second preselected values, is supplied to said input port.

15. An electrical pulse train detector comprising:
logic network means having first and second input terminals and first and second output states;
means for supplying at least one train of electrical pulses to said first input terminal, thereby to switch said logic network from its first to its second output state, and to the next-mentioned generating means;
means, responsive to said electrical pulses, for generating a resetting signal for said logic network means thereby to switch said means from its second to its first output state after the occurrence of the last pulse in said train, said means including,
semiconductor device means having anode, cathode and gate electrodes, and terminals corresponding thereto, said supplying means being electrically connected to said anode electrode terminal;
integrating circuit means coupled to said anode electrode terminal;
bias voltage dividing circuit means coupled to said gate electrode terminal;
load impedance means coupled to said cathode electrode terminal, and having an output terminal; and
means for electrically coupling said output terminal to said second input terminal of said logic network means.

16. An electrical circuit comprising:
first and second input ports;
means for supplying a sequence of electrical pulse trains to said first input port;
means for supplying to said second input port, a signal representative of the last pulse in each pulse train in said sequence;
an output port;
J-K flip-flop means having its J and K input terminals electrically connected together, and further having at least one output terminal connected to said output port;
logic network means for supplying signals to said J and K terminals;
means, coupled to said first input port, for counting the number of electrical pulses in each pulse train supplied to said input port;
first means, coupled to said second input port, for supplying clock pulses to said flip-flop means and for supplying resetting pulses to said counting means;
means, responsive to said counting means, for deriving separate output signals representative of at least a count of one, four, nine and ten pulses respectively;
means for coupling said last-mentioned output signals to said logic network means;
second means, coupled to said second input port, for deriving an output signal representative of the ordinal position of each pulse train in the sequence supplied to said first input port; and
means for coupling said ordinal representative signals to said logic network means;
the combination being so constructed and arranged that said flip-flop means is enabled, and changes its output state in response to a clock pulse, when the first pulse train in a supplied sequence consists of ten pulses, or when the second pulse train in a supplied sequence consists of either one or ten pulses, except when the first pulse train in said last-mentioned sequence consists of either four or nine pulses, and the second and third pulse trains in said sequence respectively consist of one pulse.

17. A toll restriction circuit for preventing the placement of unauthorized toll calls from a preselected subset connected to a telephone central office by a pair of wires, said circuit comprising:
means, responsive to the electrical pulse train representative of digits dialed at said subset, for deriving a light output signal representative of said electrical pulse train;
means, responsive to said light output signal, for generating an electrical pulse for each light pulse occurring in said light output signal, and having a width in a preselected range of widths, said preselected range corresponding to the range of widths of dial pulses in said electrical pulse train;
means for coupling said generated pulses to the next-mentioned first and second means;
first means and second means responsive to said generated pulses, said first means for generating and supplying an electrical signal to said second means, said electrical signal being representative of the ordinal position of digits dialed at said subset, and said second means, being constructed and arranged to combine the inputs thereto, for determining whether digits dialed at said subset constitute a dialing code to be restricted, and for generating an output signal representative of said determination;
the combination being so constructed and arranged that an output signal, representative of the determination that a dialing code to be restricted has been dialed, is generated when the first digit dialed is 0, or when the second digit dialed is 0 or 1.

18. The toll restriction circuit according to claim 17 further including means, responsive to said output signal, for electrically disconnecting said subset from said central office, when the digits dialed at said subset constitute a dialing code to be restricted.

19. A toll restriction circuit for preventing the placement of unauthorized toll calls from a preselected subset connected to a telephone central office by a pair of wires, said circuit comprising:

means, responsive to the electrical pulse train representative of digits dialed at said subset, said means including optoelectronic device means, for deriving a light output signal representative of said electrical pulse train;

means, responsive to said light output signal, for generating an electrical pulse for each light pulse occurring in said light output signal, and having a width in a preselected range of widths, said preselected range corresponding to the range of widths of dial pulses in said electrical pulse train;

means for coupling said generating pulses to the next-mentioned first and second means;

first means and second means responsive to said generated pulses, said first means for generating and supplying an electrical signal to said second means, said electrical signal being representative of the ordinal position of digits dialed at said subset, and said second means, being constructed and arranged to combine the inputs thereto, for determining whether digits dialed at said subset constitute a dialing code to be restricted, and for generating an output signal representative of said determination;

the combination being so constructed and arranged that an output signal, representative of the determination that a dialing code to be restricted has been dialed, is generated when the first digit dialed is 0, or when the second digit dialed is 0 or 1.

20. A method for preventing the placement of unauthorized toll calls from a preselected subset electrically connected by a pair of wires to apparatus of a telephone central office, without interfering with the function of said apparatus, comprising the steps of:

a. converting at least the electrical pulse train representative of digits dialed at said subset into a light signal, and converting said light signal into a first electrical signal, thereby galvanically isolating the effects of next-following steps from said telephone central office apparatus;

b. deriving a first electrical pulse for each electrical pulse occurring in said first electrical signal, and having a width in a preselected range of widths, said preselected range corresponding to the range of widths of dial pulses in said electrical pulse train;

c. counting the number of said derived electrical pulses and developing a second electrical signal representative of the number counted;

d. deriving a third electrical signal from said first electrical pulses, said third signal being representative of the last dial pulse in each digit dialed;

e. combining said second and third electrical signals to determine whether the first digit dialed at said subset 0, and if not, whether the second digit dialed is 0 or 1; and f. automatically interruputing the electrical connection between said subset and said central office, upon determining that the first digit dialed is 0, or that the second digit dialed is 0 or 1.

21. The method according to claim 20 including the further steps of (h) combining said second and third electrical signals to determine (i) whether the first digit dialed at said subset is 0 or 1, and (ii) whenever the second digit dialed is 0 or 1, whether the immediately preceding digit is 4 or 9, and whether the immediately succeeding digit is 1; and (j) automatically interrupting the electrical connection between said subset and said central office, (i) upon determining that the first digit dialed is 0 or 1, or (ii) whether the second digit dialed is 0 or 1, upon determining that said immediately preceding digit is not 4 or 9, or that said immediately succeeding digit is not 1.

22. A toll restriction circuit for preventing the placement of unauthorized toll calls from a preselected subset connected to a telephone central office by a pair of wires, said circuit comprising:

means, responsive to the electrical pulse train representative of digits dialed at said subset, including a first optoelectronic device means, having an input electric port and an output optic port, for deriving a light output signal at said optic port representative of said electric pulse train;

first means for converting said light output signal into a first electrical signal;

means, responsive to said first electrical signal developed by said converting means, for generating an electrical output pulse for each electrical pulse occurring in said first electrical signal, and having a width in a preselected range of widths, said preselected range corresponding to the range of widths of dial pulses in said electrical pulse train;

means for coupling said generated pulses to the next-mentioned first and second means;

first means and second means responsive to said generated pulses, said first means for generating and supplying a second electrical signal to said second means, said second electrical signal being representative of the ordinal position of digits dialed at said subset, and said second means including logic network means, being constructed and arranged to combine the inputs thereto, for determining whether the digits dialed at said subset constitute a dialing code to be restricted, and for generating an output signal representative of said determination;

the combination being so constructed and arranged that an output signal, representative of the determination that a dialing code to be restricted has been dialed, is generated when the first digit dialed is 0, or when the second digit dialed is 0 or 1.

23. The toll restriction circuit according to claim 22 further including means, responsive to said output signal, for electrically disconnecting said subset from said central office, when the digits dialed at said subset constitute a dialing code to be restricted.

24. The toll restriction circuit according to claim 23 wherein said converting means includes a second optoelectronic device means, having an input optic port to which said light output signal is coupled, and an output electric port at which said first electrical signal appears.

25. The toll restriction circuit according to claim 24 wherein said electrical output pulse generating means comprises:

an electrical input port to which said first electrical signal is supplied;

an electrical output port;

NAND gate means for generating an output pulse, said means having first and second input terminals and an output terminal;

means for coupling said output terminal to said output port;

bistable binary element means having set and reset input terminals and at least one output terminal;

means for coupling said one output terminal to the first input terminal of sand NAND gate means;

first means, responsive to said first electrical signal, for generating a gating signal when the width of an electrical pulse, occurring in said first electrical signal, exceeds a first preselected value, the duration of said gating signal being substantially equal to the width of said electrical pulse;

means for coupling said gating signal to the second input terminal of said NAND gate means;

second means, having first and second input terminals, for generating a first reset signal in response to an input signal at said first terminal, when said input signal has a duration greater than a second preselected value, and for generating a second reset signal in response to an input signal at said second input terminal;

means for coupling said gating signal to said first input terminal of said second means;

means for coupling the output terminal of said NAND gate means to said second input terminal of said second means; and means for coupling said reset signals to said reset input terminal;

the combination being so constructed and arranged that an output pulse is generated at said output port when an electrical pulse, having a width within the range defined by said first and second preselected values, occurs in said first electrical signal supplied to said input port.

26. The toll restriction circuit according to claim 25 wherein said second means responsive to said electrical output pulses comprises:

J-K flip-flop means having its J and K input terminals electrically connected together;

means for supplying clock pulses to said flip-flop means;

second logic network means for supplying signals to said J and K terminals;

means for counting the number of said electrical output pulses produced by said electrical pulse generating means;

means, responsive to said counting means, for deriving at least separate output signals representative of the count of one, four, nine and ten pulses, respectively;

means for coupling said last-mentioned output signals to said second logic network means;

means, responsive to the output of said first logic network means, for deriving separate signals representative of the occurrence of the first, second and third digits dialed; and means for coupling said last-mentioned digit representative signals to said second logic network means;

the combination being so constructed and arranged that said flip-flop means is enabled, and changes its output state in response to a clock pulse, when the first digit in a dialed sequence is 0 or 1, or when the second digit in a dialed sequence is 0 or 1, except when the first digit dialed in said last-mentioned sequence is 4 or 9, and the second and third digits are 1.

27. The toll restriction circuit according to claim 26 which further comprises:

means, electrically connected to the other of said wires, for supplying a portion of the signals transmitted on said pair of wires from said central office to said subset, including at least the signal representative of the electrical disconnection of said central office from said subset, said supplying means including a third optoelectronic device means, having an input electric port and an output optic port, for deriving a light output signal at said optic port representative of said supplied signals;

means, including a fourth optoelectronic device means, having an input optic port to which said last-mentioned light output signal is coupled, and an output electric port, for converting at least the portion of said derived light output signal constituting said electrical disconnection representative signal into a third electrical signal; and means for supplying said third electrical signal to said resetting signal generating and supplying means;

the combination being so constructed and arranged that said resetting signal generating and supplying means is operative to restore said first and second logic network means to their respective quiescent states, when an electrical signal representative of the electrical disconnection of said central office from said subset is transmitted on said pair of wires.

* * * * *

UNITED STATES PATENT OFFICE
CERTIFICATE OF CORRECTION

Patent No. 3,860,762 Dated January 14, 1975

Inventor(s) Gerhart F. Klaiber et al

It is certified that error appears in the above-identified patent and that said Letters Patent are hereby corrected as shown below:

Col. 5, line 18: Change "restricted" to --restriction--.
Col. 8, line 26: Change "enought" to --enough--.
Col. 9, line 58: Change "iputs" to --input --.
Col. 11, line 12: Change "560" to --506--.
Col. 12, line 36: Change "500" to --600--.
Col. 12, line 51: Change "trains" to --operation--.
Col. 12, line 53: Change "trans" to --trains--.
Col. 14, line 24: Delete "As a result the generator 625 switched on".

Col. 20, line 66: Change "this" to --that--.
After "TABLE" insert --IV--.
Col. 28, line 49: Change "electric: to --electrical--.
Col. 31, line 61: After determine insert --(i)--.
Col. 31, line 62: After subset insert --is--; and after not, insert--(ii)--.

Signed and sealed this 1st day of April 1975.

(SEAL)
Attest:

RUTH C. MASON
Attesting Officer

C. MARSHALL DANN
Commissioner of Patents
and Trademarks

FORM PO-1050 (10-69)

USCOMM-DC 60376-P69
★ U.S. GOVERNMENT PRINTING OFFICE : 1969 O—366-334.